United States Patent
Xu et al.

(10) Patent No.: US 11,671,978 B2
(45) Date of Patent: Jun. 6, 2023

(54) HYBRID SCHEDULING TECHNIQUES

(71) Applicant: QUALCOMM Incorporated, San Diego, CA (US)

(72) Inventors: Huilin Xu, San Diego, CA (US); Peter Pui Lok Ang, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 17/124,189

(22) Filed: Dec. 16, 2020

(65) Prior Publication Data

US 2021/0195625 A1 Jun. 24, 2021

Related U.S. Application Data

(60) Provisional application No. 62/950,092, filed on Dec. 18, 2019.

(51) Int. Cl.
*H04W 72/23* (2023.01)
*H04W 88/08* (2009.01)
*H04W 88/02* (2009.01)

(52) U.S. Cl.
CPC ............ *H04W 72/23* (2023.01); *H04W 88/02* (2013.01); *H04W 88/08* (2013.01)

(58) Field of Classification Search
CPC .. H04W 88/02; H04W 88/08; H04W 72/1289
(Continued)

(56) References Cited

U.S. PATENT DOCUMENTS

| | | | | |
|---|---|---|---|---|
| 2018/0279356 A1* | 9/2018 | Feng | ............ | H04L 5/0053 |
| 2020/0288482 A1* | 9/2020 | Yi | ............ | H04L 5/0064 |
| 2022/0210816 A1* | 6/2022 | Wu | ............ | H04B 7/0408 |

FOREIGN PATENT DOCUMENTS

| | | | | |
|---|---|---|---|---|
| EP | 2848082 A1 | 3/2015 | | |
| WO | WO-2013169173 A1 * | 11/2013 | ............ | H04W 72/042 |

OTHER PUBLICATIONS

CATT: "Configuration and Monitoring of the Group-Common PDCCH", 3GPP Draft, 3GPP TSG RAN WG1 Meeting #AH_NR2, R1-1710082, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-June. 30, 2017, Jun. 26, 2017, 5 Pages, XP051299306, Retrieved from the Internet: URL: http://www.3gpp.org/ftp/Meetings_3GPP_SYNC/RAN1/Docs/ [retrieved on Jun. 26, 2017] Paragraphs [02.1]-[02.2].

(Continued)

*Primary Examiner* — Peter G Solinsky
(74) *Attorney, Agent, or Firm* — Holland & Hart LLP

(57) ABSTRACT

Methods, systems, and devices for wireless communications are described. A user equipment (UE) may identify a hybrid scheduling configuration that includes a dynamic scheduling indication, a preconfiguration including initial scheduling parameters, and a set of preconfigured occasions for communicating data with a base station. The UE may monitor for the dynamic scheduling indication based on the initial scheduling parameters and the set of the preconfigured occasions. For instance, the UE may monitor for the dynamic scheduling indication during periodic occasions, monitor for the dynamic scheduling indication using a different periodicity, or monitor based on a time interval (e.g., a slot) during which both the preconfigured occasion and the dynamic scheduling indication occur. In any case, the UE may communicate with the base station after receiving the dynamic scheduling indication, where data may be transmitted to, or received from, the base station in accordance with the hybrid scheduling configuration.

30 Claims, 19 Drawing Sheets

(58) Field of Classification Search
USPC .......................................................... 370/329
See application file for complete search history.

(56) References Cited

OTHER PUBLICATIONS

International Search Report and Written Opinion—PCT/US2020/065538—ISA/EPO—dated Mar. 30, 2021.
Panasonic: "Configuration for Semi-Persistent Scheduling", 3GPP TSG RAN WG2 #61 bis, vol. R2-081575, No. 61 bis, Mar. 31, 2008-Apr. 4, 2008, pp. 1-4, Mar. 31, 2008 (Mar. 31, 2008), XP002498996, Retrieved from the Internet: URL: http://www.3gpp.org/ftp/tsg_ran/WG2_RL2/TSGR2_61bis/Docs/ [retrieved on Mar. 31, 2008] Paragraphs [02 .1]-[02. 3].

* cited by examiner

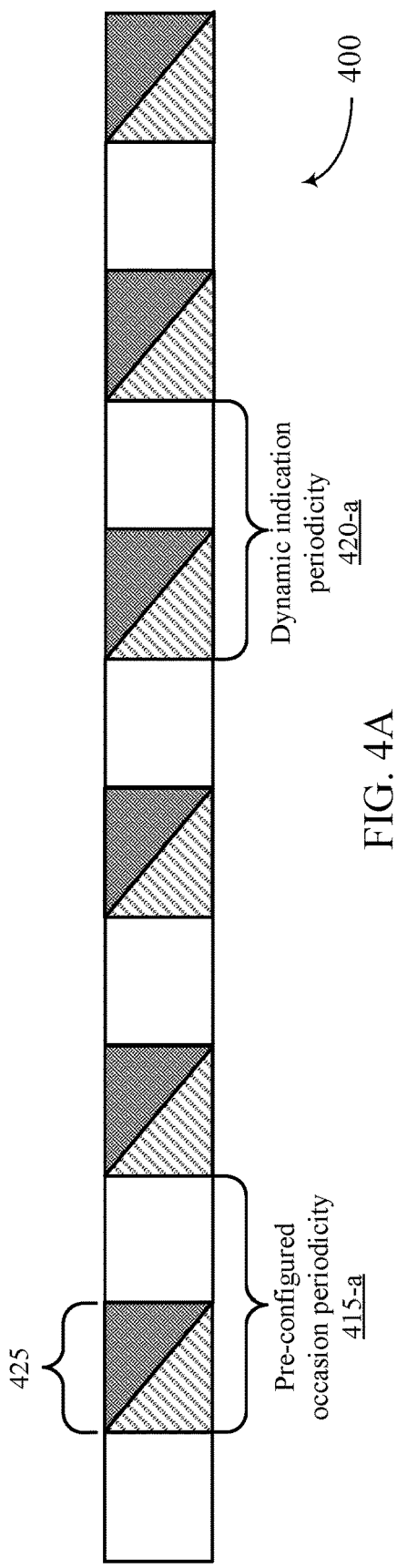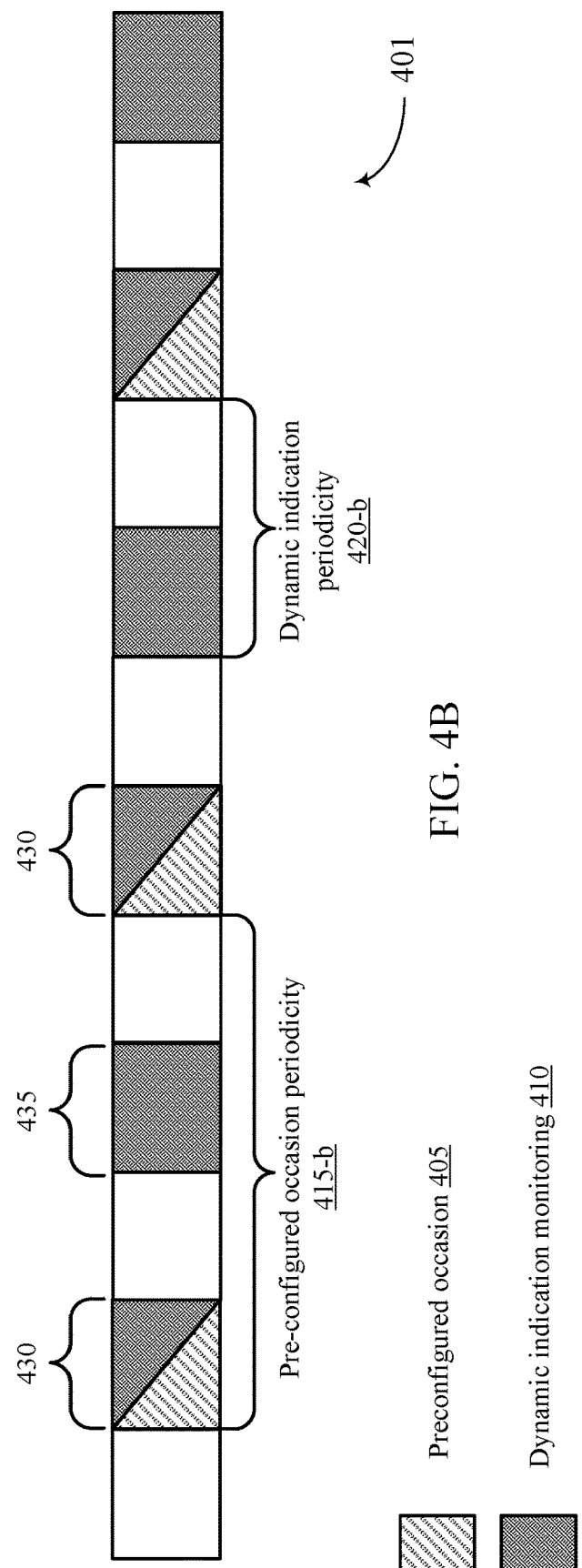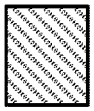
FIG. 4A
FIG. 4B

600

HYBRID SCHEDULING TECHNIQUES

CROSS REFERENCE

The present application for patent claims the benefit of U.S. Provisional Patent Application No. 62/950,092 by XU et al., entitled "HYBRID SCHEDULING TECHNIQUES," filed Dec. 18, 2019, assigned to the assignee hereof, and expressly incorporated by reference in its entirety.

BACKGROUND

The following relates generally to wireless communications, and more specifically to hybrid scheduling techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UEs).

A base station may transmit scheduling information that may, for example, indicate downlink resource assignments, uplink transmission grants, or both. However, in some cases, scheduling information that is frequently transmitted may create unnecessary overhead in a system. On the other hand, techniques that use non-dynamic scheduling may not provide for enough flexibility to adjust scheduling parameters or adapt to different types of traffic in the system.

SUMMARY

The described techniques relate to improved methods, systems, devices, and apparatuses that support hybrid scheduling techniques. Generally, the described techniques provide for hybrid scheduling configurations. A hybrid scheduling configuration may include both preconfigured scheduling occasions (e.g., during which data may be scheduled and communicated) and dynamic scheduling information (which may indicate the scheduling occasions in which data may be communicated). As such, one or more user equipment (UEs) may be configured with preconfiguration information that may indicate a set of scheduling occasions and scheduling parameters, such as resource assignment information, coding scheme information, feedback timing, or the like. In some cases, the dynamic scheduling information may indicate additional or alternative scheduling information that modifies or replaces some initial, preconfigured scheduling parameters. The dynamic scheduling information may be compact (e.g., provide a discreet amount of information), support efficient decoding, and in some examples, may include UE-specific information for multiple UEs. In some cases, the dynamic scheduling information may reduce the complexity and power consumption at a UE for decoding, thereby improving UE power efficiency. The dynamic scheduling information may additionally or alternatively improve scheduling flexibility.

A method of wireless communication at a UE is described. The method may include identifying a hybrid scheduling configuration that includes a dynamic scheduling indication, a preconfiguration including initial scheduling parameters, and a set of preconfigured occasions for communicating data, monitoring for the dynamic scheduling indication based on the initial scheduling parameters and the set of preconfigured occasions, and communicating with a base station based on receiving the dynamic scheduling indication.

An apparatus for wireless communication at a UE is described. The apparatus may include a processor, memory coupled with the processor, and instructions stored in the memory. The instructions may be executable by the processor to cause the apparatus to identify a hybrid scheduling configuration that includes a dynamic scheduling indication, a preconfiguration including initial scheduling parameters, and a set of preconfigured occasions for communicating data, monitor for the dynamic scheduling indication based on the initial scheduling parameters and the set of preconfigured occasions, and communicate with a base station based on receiving the dynamic scheduling indication.

Another apparatus for wireless communication at a UE is described. The apparatus may include means for identifying a hybrid scheduling configuration that includes a dynamic scheduling indication, a preconfiguration including initial scheduling parameters, and a set of preconfigured occasions for communicating data, monitoring for the dynamic scheduling indication based on the initial scheduling parameters and the set of preconfigured occasions, and communicating with a base station based on receiving the dynamic scheduling indication.

A non-transitory computer-readable medium storing code for wireless communication at a UE is described. The code may include instructions executable by a processor to identify a hybrid scheduling configuration that includes a dynamic scheduling indication, a preconfiguration including initial scheduling parameters, and a set of preconfigured occasions for communicating data, monitor for the dynamic scheduling indication based on the initial scheduling parameters and the set of preconfigured occasions, and communicate with a base station based on receiving the dynamic scheduling indication.

In some examples of the method, apparatuses, and non-transitory computer-readable medium described herein, monitoring for the dynamic scheduling indication may include operations, features, means, or instructions for monitoring for a dynamic scheduling physical downlink control channel including downlink control information, the downlink control information having UE-specific information for one or more UEs.

Some examples of the method, apparatuses, and non-transitory computer-readable medium described herein may further include operations, features, means, or instructions for receiving the dynamic scheduling physical downlink control channel, and decoding the dynamic scheduling physical downlink control channel to obtain scheduling information for one or more of the set of preconfigured occasions, where communicating with the base station may be based on the scheduling information.

Some examples of the method, apparatuses, and non-transitory computer-readable medium described herein may further include operations, features, means, or instructions for identifying, via the downlink control information, one or more scheduling parameters, where the one or more scheduling parameters include a time-domain resource assignment, a modulation and coding scheme (MCS), a hybrid automatic feedback request (HARQ) feedback timing, or a combination thereof.

Some examples of the method, apparatuses, and non-transitory computer-readable medium described herein may further include operations, features, means, or instructions for receiving, from the base station, an indication of a periodicity and initial scheduling parameters for downlink transmissions, where the set of preconfigured occasions may be based on the periodicity and the initial scheduling parameters for the downlink transmissions.

Some examples of the method, apparatuses, and non-transitory computer-readable medium described herein may further include operations, features, means, or instructions for receiving, from the base station, an indication of a periodicity and initial scheduling parameters for uplink transmissions, where the set of preconfigured occasions may be based on the periodicity and the initial scheduling parameters for the uplink transmissions.

Some examples of the method, apparatuses, and non-transitory computer-readable medium described herein may further include operations, features, means, or instructions for identifying a control resource set and a search space set that configures the dynamic scheduling indication, identifying a first set of parameters for monitoring for the dynamic scheduling indication based on the control resource set, and identifying a second set of parameters for monitoring for the dynamic scheduling indication based on the search space set, where the monitoring may be based on the first set of parameters and the second set of parameters.

In some examples of the method, apparatuses, and non-transitory computer-readable medium described herein, the first set of parameters includes frequency-domain resources for the dynamic scheduling indication and a duration of one or more symbols for monitoring for the dynamic scheduling indication, and the second set of parameters includes a monitoring occasion periodicity, a monitoring occasion offset, a starting symbol for monitoring occasions, an aggregation level, a number of downlink control channel candidates for each aggregation level, or a combination thereof.

Some examples of the method, apparatuses, and non-transitory computer-readable medium described herein may further include operations, features, means, or instructions for identifying one or more monitoring occasions for the dynamic scheduling indication, the one or more monitoring occasions coinciding with the set of preconfigured occasions, where monitoring for the dynamic scheduling indication may be in accordance with the one or more monitoring occasions and the set of preconfigured occasions.

Some examples of the method, apparatuses, and non-transitory computer-readable medium described herein may further include operations, features, means, or instructions for identifying one or more monitoring occasions for the dynamic scheduling indication, where monitoring for the dynamic scheduling indication may be performed during each monitoring occasion of the one or more monitoring occasions that corresponds to a preconfigured scheduling occasion of the set of preconfigured occasions.

Some examples of the method, apparatuses, and non-transitory computer-readable medium described herein may further include operations, features, means, or instructions for identifying one or more monitoring occasions for the dynamic scheduling indication, where monitoring for the dynamic scheduling indication may be performed during each monitoring occasion of the one or more monitoring occasions that corresponds to a preconfigured scheduling occasion of the set of preconfigured occasions, and where the one or more monitoring occasions may be based on a monitoring pattern indicated by a search space set configuration.

In some examples of the method, apparatuses, and non-transitory computer-readable medium described herein, monitoring for the dynamic scheduling indication may include operations, features, means, or instructions for monitoring for the dynamic scheduling indication during one or more monitoring occasions based on a monitoring pattern indicated by a search space set configuration. In some examples of the method, apparatuses, and non-transitory computer-readable medium described herein, the set of preconfigured occasions include a subset of the one or more monitoring occasions.

In some examples of the method, apparatuses, and non-transitory computer-readable medium described herein, identifying the hybrid scheduling configuration may include operations, features, means, or instructions for identifying two or more preconfigured occasion patterns for the set of preconfigured occasions, where a first dynamic scheduling indication may be associated with a first preconfigured occasion pattern of the two or more preconfigured occasion patterns and a second dynamic scheduling indication may be associated with a second preconfigured occasion pattern of the two or more preconfigured occasion patterns, and where monitoring for the dynamic scheduling indication includes, and monitoring for at least one of the first dynamic scheduling indication or the second dynamic scheduling indication.

Some examples of the method, apparatuses, and non-transitory computer-readable medium described herein may further include operations, features, means, or instructions for receiving an indication that the first dynamic scheduling indication may be associated with the first preconfigured occasion pattern and that the second dynamic scheduling indication may be associated with the second preconfigured occasion pattern. In some examples of the method, apparatuses, and non-transitory computer-readable medium described herein, the indication may be received via radio resource control signaling, via the dynamic scheduling indication, or a combination thereof.

In some examples of the method, apparatuses, and non-transitory computer-readable medium described herein, identifying the hybrid scheduling configuration may include operations, features, means, or instructions for identifying two or more preconfigured occasion patterns for the set of preconfigured occasions, where the dynamic scheduling indication may be associated with each of the two or more preconfigured occasion patterns.

In some examples of the method, apparatuses, and non-transitory computer-readable medium described herein, the dynamic scheduling indication includes an indication of whether at least one of the two or more preconfigured occasion patterns includes a data transmission during a corresponding preconfigured occasion. In some examples of the method, apparatuses, and non-transitory computer-readable medium described herein, the dynamic scheduling indication includes a respective indication of whether each of the two or more preconfigured occasion patterns includes a data transmission during a corresponding preconfigured occasion.

Some examples of the method, apparatuses, and non-transitory computer-readable medium described herein may further include operations, features, means, or instructions for identifying, via the dynamic scheduling indication, an indication that a data transmission scheduled during an interval includes an original data transmission, or a retransmission of data associated with the set of preconfigured occasions, or a combination thereof.

In some examples of the method, apparatuses, and non-transitory computer-readable medium described herein, the original data transmission may be scheduled in accordance with the set of preconfigured occasions. Some examples of the method, apparatuses, and non-transitory computer-readable medium described herein may further include operations, features, means, or instructions for receiving a physical downlink control channel that indicates scheduling of the retransmission of the data associated with the set of preconfigured occasions, and receiving the retransmission of the data based on the received physical downlink control channel.

Some examples of the method, apparatuses, and non-transitory computer-readable medium described herein may further include operations, features, means, or instructions for identifying, via the dynamic scheduling indication, an indication that a data transmission scheduled during a first time interval includes an original data transmission, or a retransmission of data, or a combination thereof, and receiving, during the first time interval, at least one of the original data transmission or the retransmission in accordance with the set of preconfigured occasions, where another retransmission of data may be received during a second time interval different from the first time interval.

Some examples of the method, apparatuses, and non-transitory computer-readable medium described herein may further include operations, features, means, or instructions for identifying, via the dynamic scheduling indication, an indication that a data transmission scheduled during a first time interval includes an original data transmission, and receiving, during the first time interval, the original data transmission in accordance with the set of preconfigured occasions, where a retransmission of data may be received during a second time interval different from the first time interval.

Some examples of the method, apparatuses, and non-transitory computer-readable medium described herein may further include operations, features, means, or instructions for identifying, via a first dynamic scheduling indication, an indication that a first data transmission includes an original data transmission, identifying, via a second dynamic scheduling indication, an indication that a second data transmission includes a retransmission of data, and receiving the original data transmission and the retransmission of data based on the set of preconfigured occasions.

Some examples of the method, apparatuses, and non-transitory computer-readable medium described herein may further include operations, features, means, or instructions for identifying, via a first dynamic scheduling indication, an indication that a first data transmission scheduled during a first time interval includes an original data transmission, identifying, via a second dynamic scheduling indication, an indication that a second data transmission scheduled during a second time interval different from the first time interval includes a retransmission of data, and receiving, during the first time interval, the original data transmission in accordance with the set of preconfigured occasions, where the second data transmission may be received during the second time interval.

Some examples of the method, apparatuses, and non-transitory computer-readable medium described herein may further include operations, features, means, or instructions for monitoring for a physical downlink control channel that indicates a retransmission of data associated with the set of preconfigured occasions, and receiving the retransmission of data based on receiving the physical downlink control channel.

Some examples of the method, apparatuses, and non-transitory computer-readable medium described herein may further include operations, features, means, or instructions for receiving, via the dynamic scheduling indication, an indication that a physical downlink control channel that releases the set of preconfigured occasions may be transmitted.

In some examples of the method, apparatuses, and non-transitory computer-readable medium described herein, the dynamic scheduling indication includes a first physical downlink control channel having a cyclic redundancy check scrambled by a first radio network temporary identifier that may be different from a second radio network temporary identifier used to scramble a cyclic redundancy check of a second physical downlink control channel for activating the set of preconfigured occasions.

In some examples of the method, apparatuses, and non-transitory computer-readable medium described herein, the first radio network temporary identifier includes a power saving radio network temporary identifier. In some examples of the method, apparatuses, and non-transitory computer-readable medium described herein, the dynamic scheduling indication may be received in a first control resource set, or a first search space set, or both, that may be different from a second control resource set, or a second search space set, or both, for a second physical downlink control channel for activating the set of preconfigured occasions.

In some examples of the method, apparatuses, and non-transitory computer-readable medium described herein, monitoring for the dynamic scheduling indication may include operations, features, means, or instructions for monitoring for the dynamic scheduling indication during a temporally first portion of each time interval corresponding to the set of preconfigured occasions.

Some examples of the method, apparatuses, and non-transitory computer-readable medium described herein may further include operations, features, means, or instructions for identifying a maximum number of physical control channel candidates for respective aggregation levels for the dynamic scheduling indication based on a search space set configuration, where monitoring for the dynamic scheduling indication may be based on the maximum number of physical control channel candidates.

In some examples of the method, apparatuses, and non-transitory computer-readable medium described herein, the dynamic scheduling indication includes UE-specific downlink control information. Some examples of the method, apparatuses, and non-transitory computer-readable medium described herein may further include operations, features, means, or instructions for identifying, via the group-common downlink control information, a mapping of a content field included in the group-common downlink control information.

Some examples of the method, apparatuses, and non-transitory computer-readable medium described herein may further include operations, features, means, or instructions for receiving, via the dynamic scheduling indication, one or more parameters that replace or modify the initial scheduling parameters.

In some examples of the method, apparatuses, and non-transitory computer-readable medium described herein, the one or more parameters include a time domain resource assignment, a frequency domain resource assignment shift; a physical uplink control channel resource, an MCS, a HARQ feedback timing, or a combination thereof.

A method of wireless communication at a base station including is described. The method may include configuring a hybrid scheduling configuration that includes a dynamic scheduling indication, a preconfiguration including initial scheduling parameters, and a set of preconfigured occasions for communicating data, transmitting, to one or more UEs, the dynamic scheduling indication based on the initial scheduling parameters and the set of preconfigured occasions, and communicating with the one or more UEs based on transmitting the dynamic scheduling indication.

An apparatus for wireless communication at a base station including is described. The apparatus may include a processor, memory coupled with the processor, and instructions stored in the memory. The instructions may be executable by the processor to cause the apparatus to configure a hybrid scheduling configuration that includes a dynamic scheduling indication, a preconfiguration including initial scheduling parameters, and a set of preconfigured occasions for communicating data, transmit, to one or more UEs, the dynamic scheduling indication based on the initial scheduling parameters and the set of preconfigured occasions, and communicate with the one or more UEs based on transmitting the dynamic scheduling indication.

Another apparatus for wireless communication at a base station including is described. The apparatus may include means for configuring a hybrid scheduling configuration that includes a dynamic scheduling indication, a preconfiguration including initial scheduling parameters, and a set of preconfigured occasions for communicating data, transmitting, to one or more UEs, the dynamic scheduling indication based on the initial scheduling parameters and the set of preconfigured occasions, and communicating with the one or more UEs based on transmitting the dynamic scheduling indication.

A non-transitory computer-readable medium storing code for wireless communication at a base station including is described. The code may include instructions executable by a processor to configure a hybrid scheduling configuration that includes a dynamic scheduling indication, a preconfiguration including initial scheduling parameters, and a set of preconfigured occasions for communicating data, transmit, to one or more UEs, the dynamic scheduling indication based on the initial scheduling parameters and the set of preconfigured occasions, and communicate with the one or more UEs based on transmitting the dynamic scheduling indication.

In some examples of the method, apparatuses, and non-transitory computer-readable medium described herein, transmitting the dynamic scheduling indication may include operations, features, means, or instructions for transmitting a dynamic scheduling physical downlink control channel including downlink control information, the downlink control information having UE-specific information for each of the one or more UEs.

Some examples of the method, apparatuses, and non-transitory computer-readable medium described herein may further include operations, features, means, or instructions for configuring, via the downlink control information, one or more scheduling parameters for the one or more UEs, where the one or more scheduling parameters include a time-domain resource assignment, an MCS, a HARQ feedback timing, or a combination thereof.

Some examples of the method, apparatuses, and non-transitory computer-readable medium described herein may further include operations, features, means, or instructions for transmitting, to the one or more UEs, an indication of a periodicity and initial scheduling parameters for downlink transmissions, where the set of preconfigured occasions may be based on the periodicity and the initial scheduling parameters for the downlink transmissions.

Some examples of the method, apparatuses, and non-transitory computer-readable medium described herein may further include operations, features, means, or instructions for transmitting, to the one or more UEs, an indication of a periodicity and initial scheduling parameters for uplink transmissions, where the set of preconfigured occasions may be based on the periodicity and the initial scheduling parameters for the uplink transmissions.

Some examples of the method, apparatuses, and non-transitory computer-readable medium described herein may further include operations, features, means, or instructions for identifying a control resource set and a search space set that configure the dynamic scheduling indication, configuring a first set of parameters for monitoring for the dynamic scheduling indication based on the control resource set, and configuring a second set of parameters for monitoring for the dynamic scheduling indication based on the search space set, where the monitoring may be based on the first set of parameters and the second set of parameters.

In some examples of the method, apparatuses, and non-transitory computer-readable medium described herein, the first set of parameters includes frequency-domain resources for the dynamic scheduling indication and a duration of one or more symbols for monitoring for the dynamic scheduling indication, and the second set of parameters includes a monitoring occasion periodicity, a monitoring occasion offset, a starting symbol for monitoring occasions, an aggregation level, a number of downlink control channel candidates for each aggregation level, or a combination thereof.

Some examples of the method, apparatuses, and non-transitory computer-readable medium described herein may further include operations, features, means, or instructions for configuring one or more monitoring occasions for the dynamic scheduling indication, the one or more monitoring occasions coinciding with the set of preconfigured occasions, where the dynamic scheduling indication may be transmitted in accordance with the one or more monitoring occasions and the set of preconfigured occasions.

Some examples of the method, apparatuses, and non-transitory computer-readable medium described herein may further include operations, features, means, or instructions for configuring one or more monitoring occasions for the dynamic scheduling indication, where the dynamic scheduling indication may be transmitted during each monitoring occasion of the one or more monitoring occasions that corresponds to a preconfigured scheduling occasion of the set of preconfigured occasions.

Some examples of the method, apparatuses, and non-transitory computer-readable medium described herein may further include operations, features, means, or instructions for configuring one or more monitoring occasions for the dynamic scheduling indication, where the dynamic scheduling indication may be transmitted during each monitoring occasion of the one or more monitoring occasions that corresponds to a preconfigured scheduling occasion of the set of preconfigured occasions, and where the one or more monitoring occasions may be based on a monitoring pattern indicated by a search space set configuration.

In some examples of the method, apparatuses, and non-transitory computer-readable medium described herein, transmitting the dynamic scheduling indication may include operations, features, means, or instructions for transmitting the dynamic scheduling indication during one or more monitoring occasions based on a monitoring pattern indicated by a search space set configuration. In some examples of the method, apparatuses, and non-transitory computer-readable medium described herein, the set of preconfigured occasions include a subset of the one or more monitoring occasions.

In some examples of the method, apparatuses, and non-transitory computer-readable medium described herein, configuring the hybrid scheduling configuration may include operations, features, means, or instructions for configuring two or more preconfigured occasion patterns for the set of preconfigured occasions, where a first dynamic scheduling indication may be associated with a first preconfigured occasion pattern of the two or more preconfigured occasion patterns and a second dynamic scheduling indication may be associated with a second preconfigured occasion pattern of the two or more preconfigured occasion patterns, and where transmitting the dynamic scheduling indication includes, and transmitting at least one of the first dynamic scheduling indication or the second dynamic scheduling indication.

Some examples of the method, apparatuses, and non-transitory computer-readable medium described herein may further include operations, features, means, or instructions for transmitting an indication that the first dynamic scheduling indication may be associated with the first preconfigured occasion pattern and that the second dynamic scheduling indication may be associated with the second preconfigured occasion pattern.

In some examples of the method, apparatuses, and non-transitory computer-readable medium described herein, the indication may be transmitted via radio resource control signaling, via the dynamic scheduling indication, or a combination thereof. In some examples of the method, apparatuses, and non-transitory computer-readable medium described herein, configuring hybrid scheduling configuration may include operations, features, means, or instructions for configuring two or more preconfigured occasion patterns for the set of preconfigured occasions, where the dynamic scheduling indication may be associated with each of the two or more preconfigured occasion patterns.

In some examples of the method, apparatuses, and non-transitory computer-readable medium described herein, the dynamic scheduling indication includes an indication of whether at least one of the two or more preconfigured occasion patterns includes a data transmission during a corresponding preconfigured occasion.

In some examples of the method, apparatuses, and non-transitory computer-readable medium described herein, the dynamic scheduling indication includes a respective indication of whether each of the two or more preconfigured occasion patterns includes a data transmission during a corresponding preconfigured occasion.

Some examples of the method, apparatuses, and non-transitory computer-readable medium described herein may further include operations, features, means, or instructions for transmitting, via the dynamic scheduling indication, an indication that a data transmission scheduled during a time interval includes an original data transmission, or a retransmission of data associated with the set of preconfigured occasions, or a combination thereof.

In some examples of the method, apparatuses, and non-transitory computer-readable medium described herein, the original data transmission may be scheduled in accordance with the set of preconfigured occasions. Some examples of the method, apparatuses, and non-transitory computer-readable medium described herein may further include operations, features, means, or instructions for transmitting a physical downlink control channel that indicates scheduling of the retransmission of the data associated with the set of preconfigured occasions, and transmitting the retransmission of the data based on the transmitted physical downlink control channel.

Some examples of the method, apparatuses, and non-transitory computer-readable medium described herein may further include operations, features, means, or instructions for transmitting, via the dynamic scheduling indication, an indication that a data transmission scheduled during a first time interval includes an original data transmission, or a retransmission of data, or a combination thereof, and transmitting, during the first time interval, at least one of the original data transmission or the retransmission in accordance with the set of preconfigured occasions, where another retransmission of data may be transmitted during a second time interval different from the first time interval.

Some examples of the method, apparatuses, and non-transitory computer-readable medium described herein may further include operations, features, means, or instructions for transmitting, via the dynamic scheduling indication, an indication that a data transmission scheduled during a first time interval includes an original data transmission, and transmitting, during the first time interval, the original data transmission in accordance with the set of preconfigured occasions, where a retransmission of data may be transmitted during a second time interval different from the first time interval.

Some examples of the method, apparatuses, and non-transitory computer-readable medium described herein may further include operations, features, means, or instructions for transmitting, via a first dynamic scheduling indication, an indication that a first data transmission includes an original data transmission, transmitting, via a second dynamic scheduling indication, an indication that a second data transmission includes a retransmission of data, and transmitting the original data transmission and the retransmission of data based on the set of preconfigured occasions.

Some examples of the method, apparatuses, and non-transitory computer-readable medium described herein may further include operations, features, means, or instructions for transmitting, via a first dynamic scheduling indication, an indication that a first data transmission scheduled during a first time interval includes an original data transmission, transmitting, via a second dynamic scheduling indication, an indication that a second data transmission scheduled during a second time interval different from the first time interval includes a retransmission of data, and transmitting, during the first time interval, the original data transmission in accordance with the set of preconfigured occasions.

Some examples of the method, apparatuses, and non-transitory computer-readable medium described herein may further include operations, features, means, or instructions for transmitting a physical downlink control channel that indicates a retransmission of data associated with the set of preconfigured occasions, and transmitting the retransmission of data based on receiving the physical downlink control channel, where the retransmission of data may be transmitted during occasions that may be different from the set of preconfigured occasions.

Some examples of the method, apparatuses, and non-transitory computer-readable medium described herein may further include operations, features, means, or instructions for transmitting, via the dynamic scheduling indication, an indication that a physical downlink control channel that releases the set of preconfigured occasions may be transmitted.

In some examples of the method, apparatuses, and non-transitory computer-readable medium described herein, the dynamic scheduling indication includes a first physical downlink control channel having a cyclic redundancy check scrambled by a first radio network temporary identifier that may be different from a second radio network temporary identifier used to scramble a cyclic redundancy check of a second physical downlink control channel for activating the set of preconfigured occasions.

In some examples of the method, apparatuses, and non-transitory computer-readable medium described herein, the first radio network temporary identifier includes a power saving radio network temporary identifier. In some examples of the method, apparatuses, and non-transitory computer-readable medium described herein, the dynamic scheduling indication may be transmitted in a first control resource set, or a first search space set, or both, that may be different from a second control resource set, or a second search space set, or both, for a second physical downlink control channel for activating the set of preconfigured occasions.

In some examples of the method, apparatuses, and non-transitory computer-readable medium described herein, transmitting the dynamic scheduling indication may include operations, features, means, or instructions for transmitting the dynamic scheduling indication during a temporally first portion of each time interval corresponding to the set of preconfigured occasions.

Some examples of the method, apparatuses, and non-transitory computer-readable medium described herein may further include operations, features, means, or instructions for configuring a maximum number of physical control channel candidates for respective aggregation levels for the dynamic scheduling indication based on a search space set configuration, and transmitting an indication of the maximum number of physical control channel candidates to the one or more UEs.

In some examples of the method, apparatuses, and non-transitory computer-readable medium described herein, the dynamic scheduling indication includes UE-specific downlink control information. Some examples of the method, apparatuses, and non-transitory computer-readable medium described herein may further include operations, features, means, or instructions for transmitting, via the group-common downlink control information, a mapping of a content field included in the group-common downlink control information.

Some examples of the method, apparatuses, and non-transitory computer-readable medium described herein may further include operations, features, means, or instructions for transmitting, via the dynamic scheduling indication, one or more parameters that replace or modify the initial scheduling parameters.

In some examples of the method, apparatuses, and non-transitory computer-readable medium described herein, the one or more parameters include a time domain resource assignment, a frequency domain resource assignment shift; a physical uplink control channel resource, an MCS, a HARQ feedback timing, or a combination thereof.

BRIEF DESCRIPTION OF THE DRAWINGS

FIGS. 3, 4A, 4B, and 5 illustrate examples of scheduling configurations that support hybrid scheduling techniques in accordance with aspects of the present disclosure.

DETAILED DESCRIPTION

Figure 1:
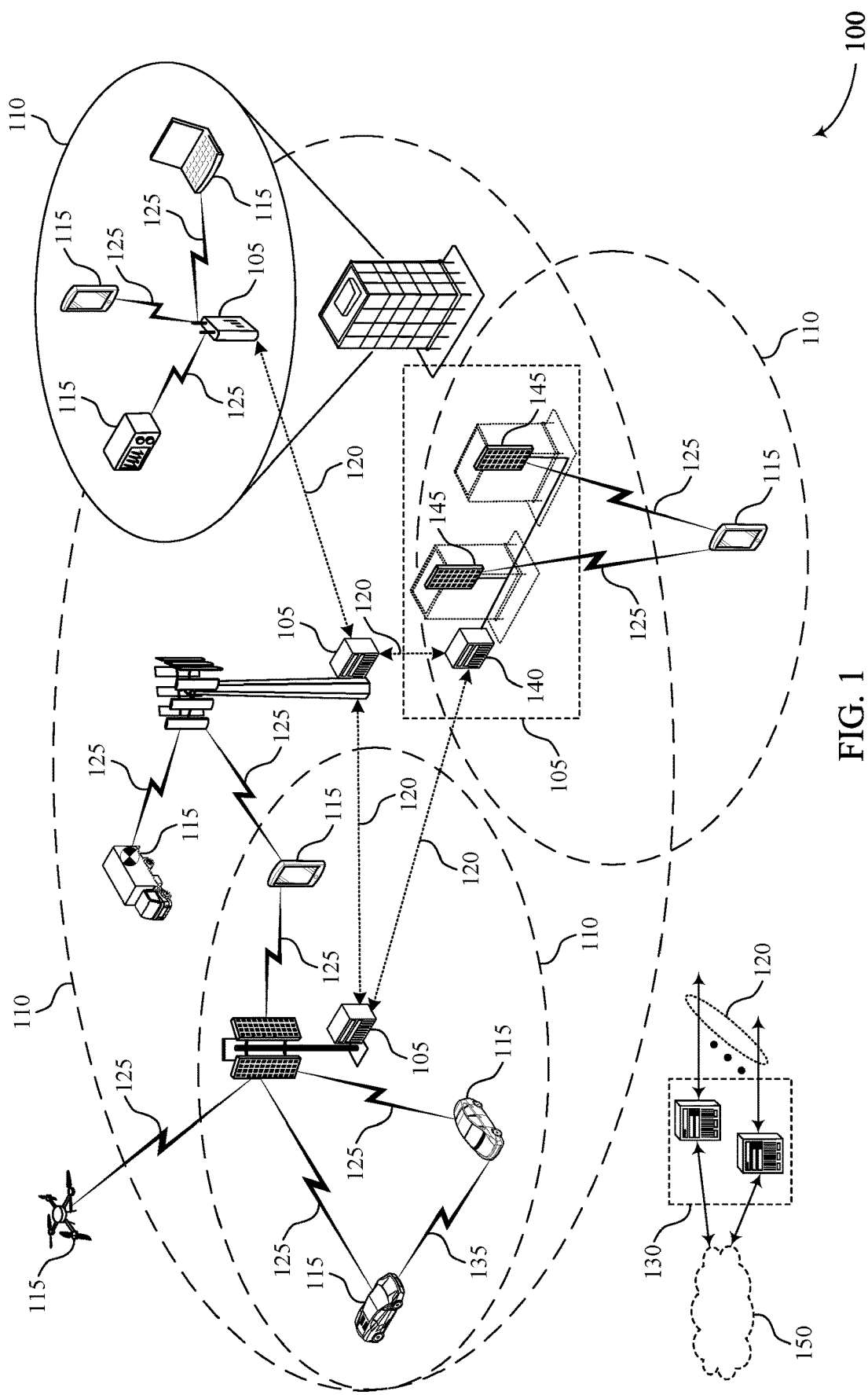
FIG. 1 illustrates an example of a wireless communications system that supports hybrid scheduling techniques in accordance with aspects of the present disclosure.

In some wireless communications systems, scheduling information may be dynamically indicated. For example, a base station may determine that data is available to be transmitted to or from a user equipment (UE), and the base station may transmit a scheduling indication (e.g., a physical downlink control channel (PDCCH) with a dynamic grant for the scheduled data) each time data is to be communicated. Such dynamic scheduling, however, may result in overhead in the system, particularly when a large number of UEs receive small amounts of data frequently. As such, techniques that enable reduced signaling of scheduling information, such as semi-persistent scheduling (SPS), may enable the configuration of periodic resources used for data transmissions, which may be activated and deactivated for a UE.

In some cases, SPS may reduce the scheduling information processing performed at a UE, where a UE may begin decoding data (e.g., over a physical downlink shared channel (PDSCH)) based on a configured assignment. In such cases, however, a UE may sometimes process, or attempt to process, data that is not present or available for the UE based on the configured assignment. For example, when data for the UE is sparse and/or non-periodic, the UE may attempt to decode an empty assignment (e.g., where no PDSCH is available) based on an SPS configuration, which may unnecessarily increase the UE's power usage. In some examples, decoding PDSCH may be more resource intensive (e.g., three times more resource intensive) than decoding PDCCH. SPS parameters may further limit scheduling flexibility. For example, SPS parameters may only be preconfigured or changed per each activation instance, and these parameters may not be dynamically adjusted.

According to aspects described herein, hybrid scheduling may be used for combining both preconfigured scheduling occasions and dynamic scheduling indications. For instance, the described hybrid scheduling techniques may include both preconfigured scheduling occasions (e.g., periodic occasions in which data may be communicated, which may be based on an SPS or configured grant configuration) and dynamic scheduling information (e.g., downlink control information (DCI), compact DCI, etc.). The preconfigured scheduling information may provide initial scheduling parameters that include a pattern of scheduling occasions (e.g., slot periodicity, offset) for one or more UEs. The preconfigured scheduling occasions may be based on SPS, and in some cases, the preconfigured occasions may be at a relaxed periodicity (e.g., every 5 milliseconds (ms)). The preconfiguration information may provide a pattern of monitoring slots (e.g., slot periodicity, offset). The dynamic scheduling information may be group-common (e.g., used by each UE in a particular group of one or more UEs) and include UE-specific information for the one or more UEs. In some cases, the dynamic scheduling information may include a subset of scheduling parameters (e.g., time-domain resource assignment (TDRA), modulation and coding scheme (MCS), hybrid automatic repeat request (HARQ) feedback timing) that is dynamically assigned for one or more scheduled UEs. The dynamic scheduling information may indicate whether an operation should be performed by the UE (e.g., decode a PDSCH), and may additionally or alternatively provide some parameters that facilitate the adjustment of data (e.g., PDSCH) scheduling.

Hybrid scheduling may provide one or more advantages within a system, including the reduction of system overhead, minimization of unnecessary decoding by a receiving device, and providing scheduling flexibility. As an example, the preconfigured scheduling information may indicate multiple occasions where data may be scheduled, and the dynamic scheduling information (e.g., dynamic PDCCH) may be monitored during each occasion by a UE, which may be less complex and power intensive than decoding (or attempting to decode) PDSCH at periodic intervals. As such, the dynamic scheduling information may reduce unnecessary decoding by indicating whether a UE should decode one or more data transmissions (e.g., PDSCHs), while also allowing for periodic transmissions with reduced signaling overhead (e.g., as compared to dynamic scheduling alone). The dynamic scheduling information may provide scheduling flexibility by supporting transmission schedule adjustment, which may be based on changes in traffic or other factors. As such, hybrid scheduling may provide an improved trade-off between dynamic scheduling overhead (e.g., transmission scheduling message capacity, UE power consumption) and scheduling flexibility.

Aspects of the disclosure are initially described in the context of a wireless communications system. Aspects are then described with respect to a scheduling configurations and control information that enables hybrid scheduling schemes. Aspects of the disclosure are further illustrated by and described with reference to apparatus diagrams, system diagrams, and flowcharts that relate to hybrid scheduling techniques.

FIG. 1 illustrates an example of a wireless communications system 100 that supports hybrid scheduling techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, wireless communications system 100 may use dynamic scheduling. For dynamic scheduling, when there is data available for one or more UEs 115, a base station 105 may transmit DCI via a PDCCH to the one or more UEs 115 that indicates the scheduling information. As such, the PDCCH carries the scheduling information for a UE 115 to decode a scheduled data channel (e.g., PDSCH). Additionally or alternatively, wireless communications system 100 may support SPS for downlink transmissions. In this case, a periodicity of data transmissions may be indicated by RRC signaling. Further, PDCCH scrambled by a particular radio network temporary identifier (RNTI) (e.g., a configured scheduling-RNTI (CS-RNTI)) may be used to active the SPS. In some cases, the PDCCH for SPS may include information such as time-frequency resources and other parameters for receiving downlink transmissions. Once the SPS is activated, data may be received at a UE 115 during one or more occasions based on the scheduling information by the PDCCH that activated the SPS. Further, when the base station 105 determines to stop the SPS data transmission(s) (e.g., there may no longer be any data to transmit to the UE 115), the base station 105 may transmit a PDCCH to release the SPS (and the configured resources for the downlink transmissions).

In other cases, wireless communications system 100 may further support configured grants for uplink communications. In this case, uplink configured grant communications may be similar to SPS, but may be used for uplink communications. Here, multiple types of configured grant configurations may be used, which may be referred to as Type 1 configured grant or Type 2 configured grant (or other like terminology). For Type 1 configured grant, scheduling information may be provided to a UE 115 by an RRC configuration, which may include a periodicity, resources for data transmissions, and an activation indication, among other information. For Type 2 configured grant, RRC may provide a data transmission periodicity, whereas a PDCCH may provide other information for uplink transmissions, including the activation of the data transmission according to the uplink configured grant (and/or release of the uplink configured grant).

Wireless communications system 100 may also support the use of hybrid scheduling techniques, which may provide for enhancements over dynamic scheduling and SPS schemes. For example, a UE 115 may receive an indication of a hybrid scheduling configuration, which may include the use of a dynamic scheduling indication (e.g., dynamic PDCCH), a preconfiguration that includes initial scheduling parameters, and a set of preconfigured occasions for communicating data (e.g., with a base station 105). Based on the initial scheduling parameters and the set of preconfigured occasions, the UE 115 may monitor for the dynamic scheduling indication transmitted by the base station 105, and may communicate with the base station 105 when a dynamic scheduling indication is received.

Figure 2:
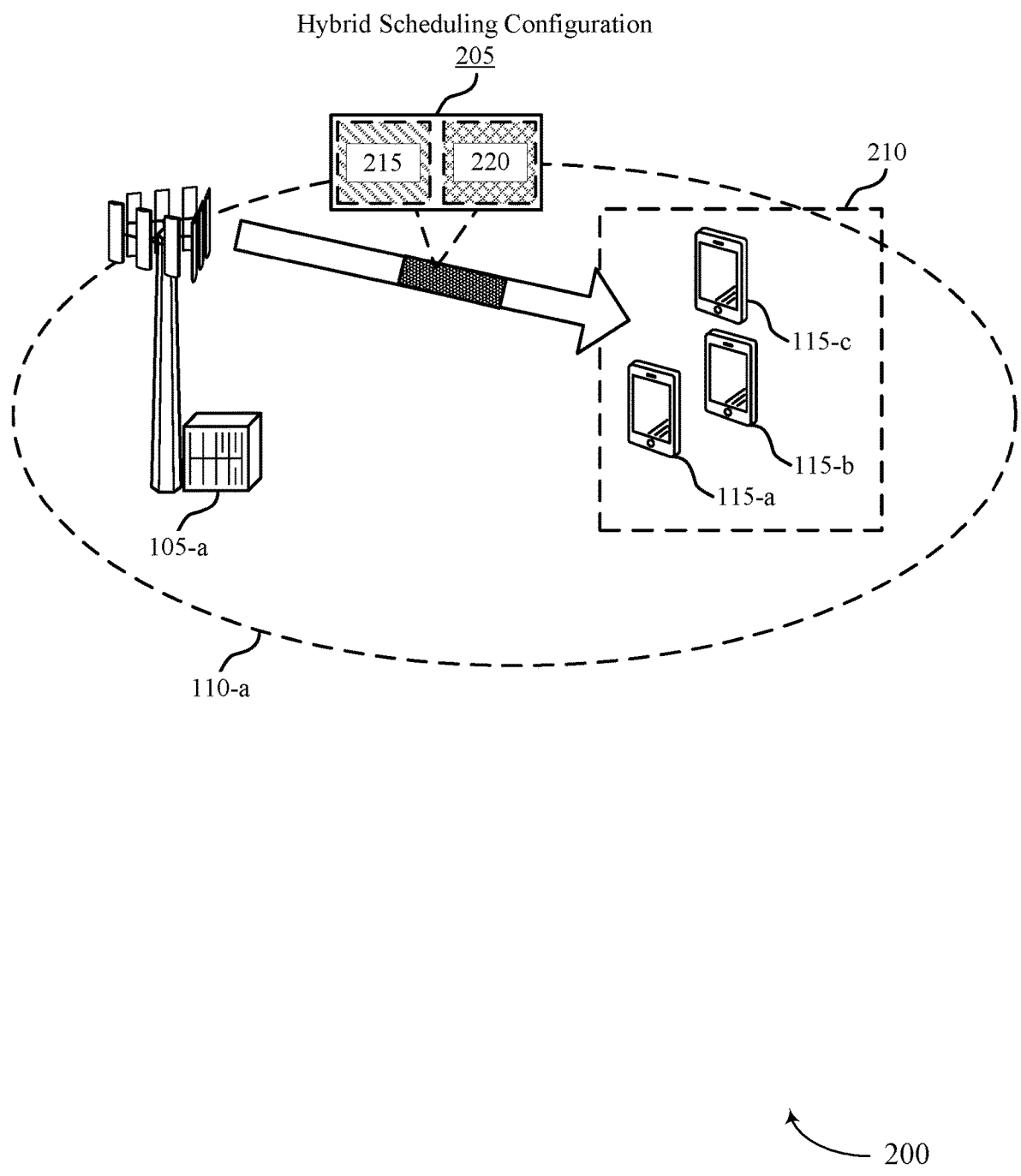
FIG. 2 illustrates an example of a wireless communications system that supports hybrid scheduling techniques in accordance with aspects of the present disclosure.

FIG. 2 illustrates an example of a wireless communications system 200 that supports hybrid scheduling techniques in accordance with aspects of the present disclosure. In some examples, the wireless communications system 200 may implement aspects of wireless communications system 100. The wireless communications system 200 includes base station 105-a, geographic coverage area 110-a, and one or more UEs 115. In some cases, wireless communications system 200 may use hybrid scheduling techniques to enhance scheduling and communications flexibility within the system.

Base station 105-a may communicate with one or more UEs 115 (e.g., UEs 115-a, 115-b, and 115-c), which may be included with a UE group 210. For example, base station 105-a may transmit a hybrid scheduling configuration 205 to UE 115-a, UE 115-b, or UE 115-c. The hybrid scheduling configuration 205 may include preconfigured scheduling information 215 and dynamic scheduling indication 220 (e.g., a PDCCH including DCI). In some cases, the hybrid scheduling configuration 205 may be signaled to a UE 115 via RRC signaling. Preconfigured scheduling information 215 may include configuration information (e.g., initial scheduling parameters, etc.), and may further indicate a set of preconfigured occasions (e.g., a slot periodicity, offset, or the like) and/or activation information (e.g., activation PDCCH information). In some cases, the configuration information may indicate allocated resources for one or more UEs 115 (e.g., of UE group 210). The dynamic scheduling indication 220 may be transmitted by base station 105-a based on the allocated resources indicated in the configuration information.

The dynamic scheduling indication 220 may include information associated with one or more UEs 115 of UE group 210 (e.g., group common, UE-specific information). For example, the dynamic scheduling indication 220 may include one or more data fields that correspond to UE 115-a, one or more data fields that correspond to UE 115-b, and so forth. In some cases, the dynamic scheduling indication 220 may be group common and may indicate, to one or more UEs 115, whether the UEs 115 may decode a downlink data transmission (e.g., PDSCH) during the set of preconfigured occasions in accordance with the hybrid scheduling configuration 205. In some examples, dynamic scheduling information 220 may be sent to UE group 210 and may indicate, implicitly or explicitly, that UEs 115-b and 115-c may refrain from decoding a downlink data transmission and that UE 115-a should decode a downlink data transmission. Dynamic scheduling indication 220 may be compact (e.g., comprise a smaller payload, include a fallback DCI format, or be a relatively less complex DCI as compared to other DCI formats) and/or multi-cast, thereby improving system efficiency. For example, dynamic scheduling indication 220 may exclude some scheduling parameters and support efficient decoding. As such, the dynamic scheduling indication 220 may support efficient spectrum use, as the dynamic scheduling indication 220 may include scheduling information for multiple UEs 115 of UE group 210. Dynamic scheduling indication 220 may additionally or alternatively improve UE power consumption by indicating to UEs 115 whether a downlink data transmission should be decoded. For example, dynamic scheduling indication 220 may reduce or eliminate unnecessary UE operations (e.g., decoding) that are associated with downlink data transmission that may otherwise be performed by one or more UEs 115.

Communication between base station 105-a and the one or more UEs 115 may be based on the hybrid scheduling configuration 205, including the use of initial scheduling parameters, the set of preconfigured occasions, and the dynamic scheduling indication 220. A preconfiguration and initial scheduling parameters included within the preconfigured scheduling information 215 may be based on SPS or a configured grant. For example, if a data transmission associated with the preconfiguration is a downlink transmission, the preconfiguration may be based on SPS, and if the data transmission associated with the preconfiguration is an uplink transmission, the preconfiguration may be based on a configured grant.

In some cases, the dynamic scheduling indication 220 (e.g., PDCCH) may be based on a PDCCH that is configured by a control resource set (CORSET) and a search space set. In some examples, the CORESET and search space set may be used dedicatedly for the dynamic scheduling indication. The CORESET may provide information about frequency-domain resources and/or a number of consecutive OFDM symbols for the monitoring occasions for the PDCCH. The search space set may provide a periodicity and offset of the monitoring occasions, starting symbols of the monitoring occasions in a time interval, or other information such as one or more aggregation levels and/or a number of PDCCH candidates for the PDCCH. In some examples, the time interval may be a transmission time interval, a slot, a sub-slot, a symbol, or the like.

Figure 3:
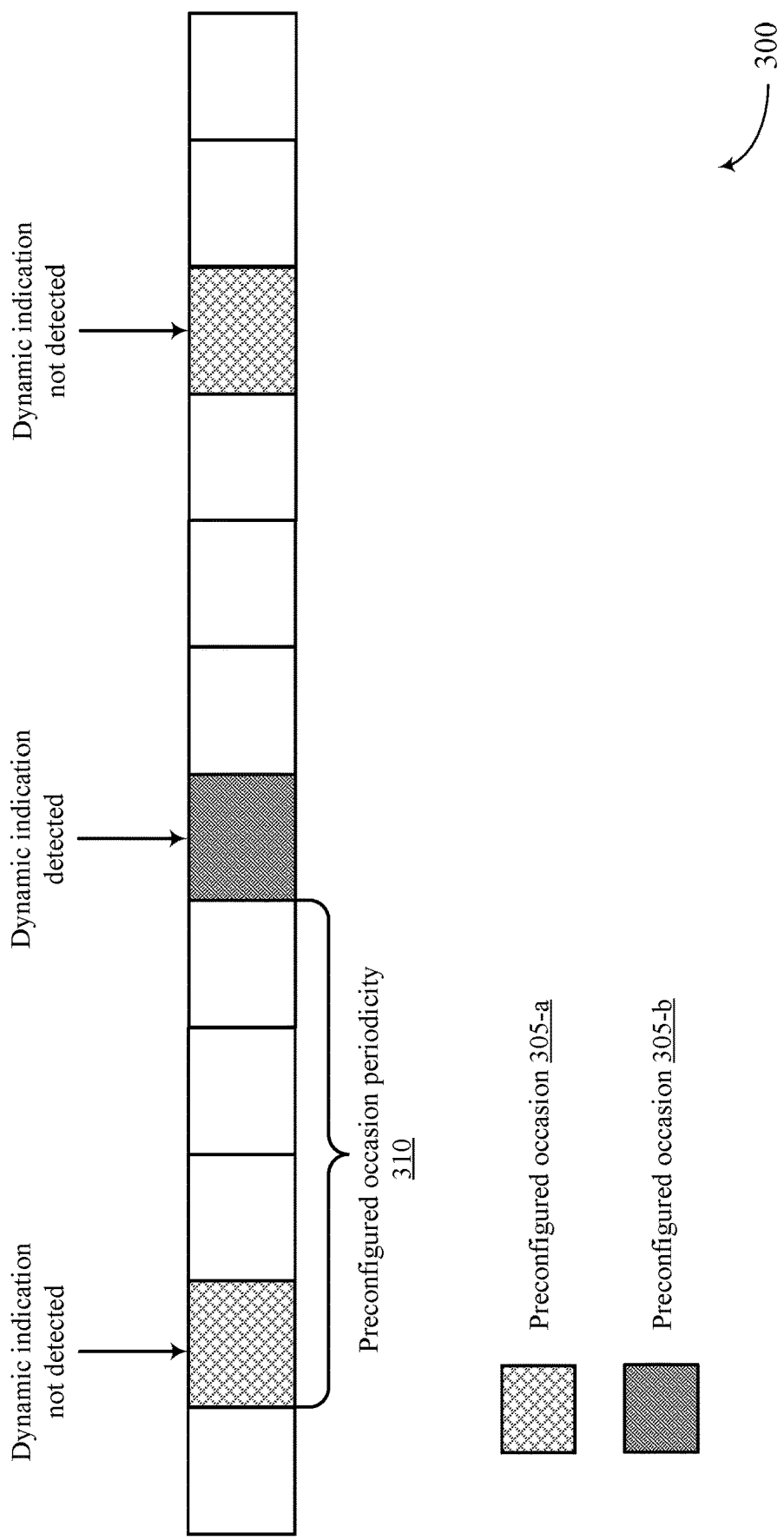

FIG. 3 illustrates an example of a scheduling configuration 300 that supports hybrid scheduling techniques in accordance with aspects of the present disclosure. In some examples, scheduling configuration 300 may implement aspects of wireless communications systems 100 and 200. For example, the scheduling configuration may be used by a UE 115 and base station 105, where the UE 115 may monitor a set of preconfigured occasions for a dynamic scheduling indication.

As an illustrative example, a base station 105 may transmit a hybrid scheduling configuration that includes an indication of preconfigured occasions for data transmissions. The hybrid scheduling configuration may include an indication of a preconfigured occasion periodicity 310 and/or preconfigured occasions to one or more UEs 115. For example, preconfigured occasion periodicity 310 may be indicated in preconfigured scheduling information 215-a as described with reference to FIG. 2.

In accordance with scheduling configuration 300, the UE 115 may monitor multiple preconfigured occasions 305, where preconfiguration information indicated to the UE 115 may provide a pattern of scheduling occasions (e.g., slot periodicity and offset). As such, the UE 115 may monitor for signaling based on a preconfigured occasion periodicity 310, where the UE 115 may attempt to decode downlink control information during each preconfigured occasion 305.

In some cases, and as described herein, the dynamic scheduling indication may have a different periodicity (e.g., based on a configuration of a search space set), which may define a pattern that is different from the pattern of scheduling occasions. As such, there may exist one or more preconfigured occasions 305-a in which a dynamic scheduling indication is not detected, while there may also exist one or more preconfigured occasions 305-b where the dynamic indication is detected. Accordingly, the UE 115 may use various techniques to determine monitoring occasions to monitor for the dynamic scheduling indication and data transmissions.

FIGS. 4A and 4B illustrate an example of scheduling configurations 400 and 401 that support hybrid scheduling techniques in accordance with aspects of the present disclosure. In some examples, scheduling configurations 400 and 401 may implement aspects of wireless communications systems 100 and 200. Scheduling configurations 400 and 401 may illustrate various configurations for both preconfigured occasions and a dynamic scheduling indication as part of a hybrid scheduling scheme. The preconfigured occasions and the dynamic scheduling indication may have the same or different periodicities, and a UE 115 may determine whether to perform monitoring (e.g., for downlink signaling, including data and/or dynamic signaling indications) based on the respective configurations.

As shown in FIG. 4A, the pattern of preconfigured occasions 405 may coincide with (e.g., be the same as) the pattern of dynamic indication monitoring occasions 410, and in some cases, a base station 105 or network entity may guarantee that the pattern of preconfigured occasions 405 corresponds to the pattern of dynamic indication monitoring occasions 410 (e.g., through a configuration of the hybrid scheduling scheme). For example, a time interval 425 (e.g., a slot) where a dynamic indication (e.g., a PDCCH) is configured to be monitored may also be a preconfigured occasion 405. For example, time intervals 425 may each correspond to both a preconfigured occasion 405 and dynamic indication monitoring occasions 410. In some cases, preconfigured occasion periodicity 415-a may be the same length (e.g., a same duration, a same number of slots, a same number of symbol periods) as dynamic indication periodicity 420-a.

As shown in FIG. 4B, the preconfigured occasions 405 may be a subset of the dynamic indication monitoring occasions 410 time intervals (e.g., slots). In some cases, the dynamic indication monitoring occasions 410 time intervals may be monitored by a UE 115 in accordance with an associated search space set configuration. For example, a UE 115 may monitor time intervals 430 for a downlink transmission (e.g., a PDCCH) in accordance with a search space set configuration.

In some examples, a UE 115 may monitor dynamic scheduling information based on the preconfigured occasions 405. For example, a UE 115 may monitor for a dynamic indication (e.g., a DCI, a compact DCI, a PDCCH, or the like) at time intervals 430 based on the preconfigured occasions 405 at those same time intervals. In some cases, a UE 115 may refrain from monitoring time intervals for a dynamic indication if the time interval is not associated with both a preconfigured occasion 405 and a dynamic indication monitoring occasion time interval (e.g., the preconfigured occasions do not overlap with the dynamic indication monitoring time intervals). For example, a UE 115 may refrain from monitoring (e.g., ignore) time intervals 435 in a search space set configuration, as those slots may not include both a preconfigured occasion 405 and a monitoring occasion for a dynamic indication.

In some cases, a UE 115 may monitor the dynamic indication monitoring occasions 410 based on a time interval being included in a preconfigured occasion 405 and the time interval being included in a dynamic indication monitoring occasion pattern based on the search space set configuration.

In other examples, a UE 115 may monitor the time intervals 430 based on the dynamic indication monitoring occasions 410. For example, a UE 115 may monitor time intervals 430 and 435 according to a search space set configuration associated with the dynamic indication monitoring occasions 410. In some examples, the preconfigured occasions 405 may be a subset of the dynamic indication monitoring occasions 410, and a UE 115 may monitor the time interval 430 based on the dynamic indication monitoring occasions 410. Monitoring time intervals 430 (e.g., slots) based on dynamic indication time intervals may improve communication be used for receiving retransmission of hybrid transmission scheduling.

Multiple patterns of preconfigured occasions 405 may be associated with a UE 115. For example, a UE 115 may be provided with a first pattern of preconfigured occasions 405 for uplink communications and a second pattern of preconfigured occasions 405 for downlink communications. In some additional or alternative examples, a UE 115 may be provided with one or more patterns of preconfigured occasions 405 for uplink communications and/or one or more patterns of preconfigured occasions 405 for downlink communications.

In some cases, a UE 115 may be associated with multiple patterns of preconfigured occasions 405, and each of the multiple patterns of preconfigured occasions 405 may be associated with a pattern of dynamic indication monitoring occasions 410. The patterns of dynamic indication monitoring occasions 410 may, for example, indicate whether data is scheduled in an occasion (e.g., time interval) for the associated preconfiguration. In some examples, the association between the pattern of preconfigured occasions 405 and the pattern of dynamic indication monitoring occasions 410 may be specified by some scheduling (e.g., RRC messaging). In some additional or alternative examples, the association between the pattern of preconfigured occasions 405 and the pattern of dynamic indication monitoring occasions 410 may be specified by the content of a transmission (e.g., a PDCCH).

In some cases, a pattern of dynamic indication monitoring occasions 410 may be associated with multiple patterns of preconfigured occasions 405. For example, a same set of bit(s) in the dynamic indication (e.g., the PDCCH) of dynamic indication monitoring occasions 410 may be used to indicate whether any of the multiple patterns of preconfigured occasions 405 has data in a time interval (e.g., a slot). In an additional or alternative example, different sets of bit(s) in the dynamic indication (e.g., PDCCH) received during one or more dynamic indication monitoring occasions 410 may indicate whether an associated preconfiguration of the multiple patterns of preconfigurations (e.g., preconfigured occasions 405) has data for the UE 115.

Figure 5:
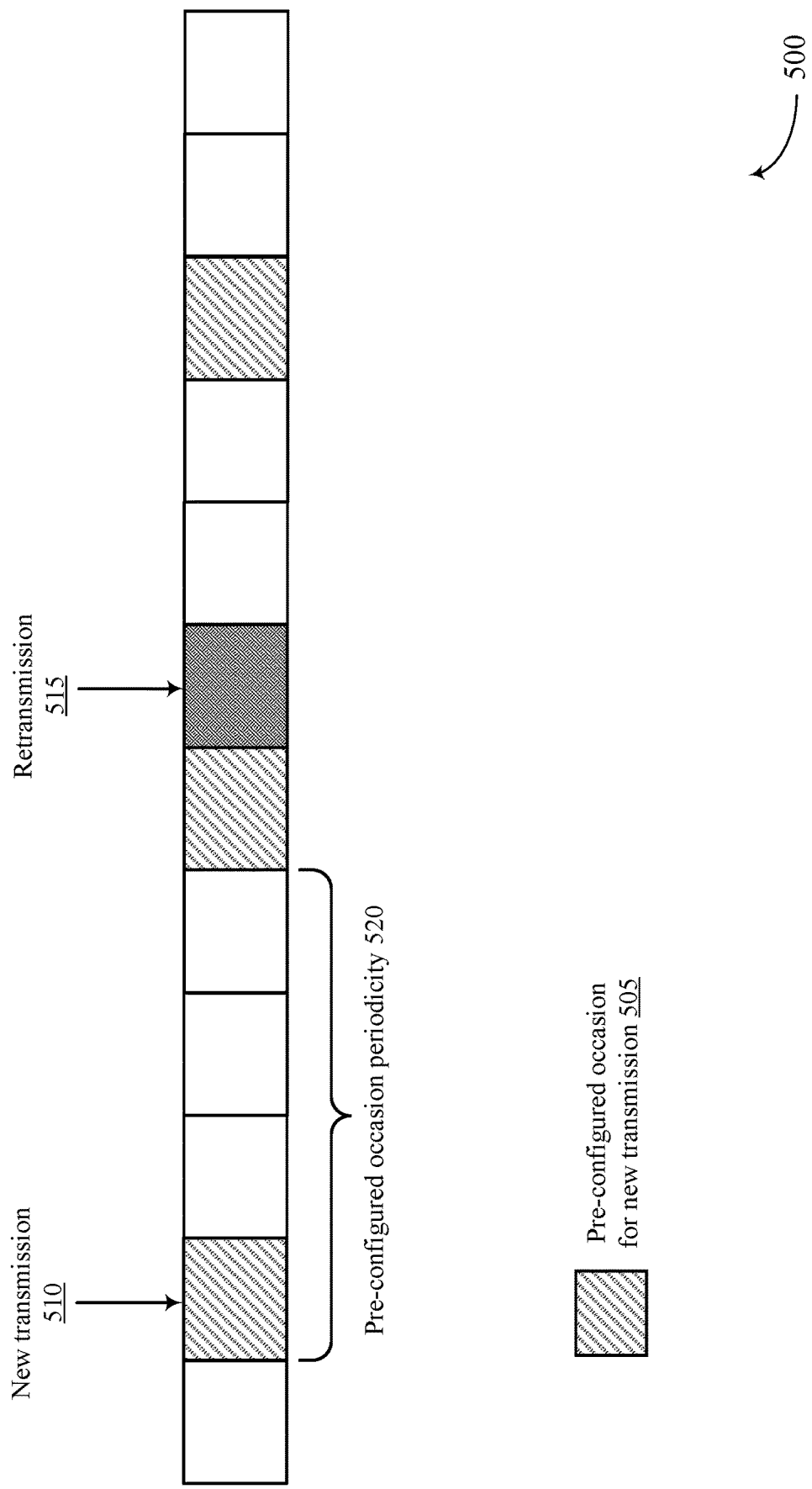

FIG. 5 illustrates an example of a scheduling configuration 500 that supports hybrid scheduling techniques in accordance with aspects of the present disclosure. In some examples, scheduling configuration 500 may implement aspects of wireless communications systems 100 and 200. The scheduling configuration 500 may illustrate a retransmission schedule for hybrid scheduling in accordance with aspects of the present disclosure.

As described herein, using a hybrid scheduling configuration, a UE 115 may monitor preconfigured occasions for data and control information that dynamically signals the presence of data during one or more preconfigured occasions. However, in some cases, the UE 115 may not receive or decode an initial transmission of data received during the preconfigured occasions. As such, a base station 105 may retransmit the data to the UE 115.

As such, a retransmission associated with a previous data transmission during the preconfigured occasions may be dynamically scheduled in another occasion (e.g., a time interval, a slot, etc.). For example, a UE 115 may be associated with a pattern of preconfigured occasions for an initial data transmission 505, and the UE 115 may receive a new transmission 510 based on the pattern of preconfigured occasions for new transmissions 505. In some cases, a dynamic indication (e.g., over a PDCCH) may indicate whether there is a new transmission based on the preconfiguration and/or whether there is a retransmission of the preconfigured data in a time interval (e.g., a slot). The indication for a new transmission may take effect in a preconfigured occasion. In some cases, the indication for a new transmission may only take effect in a preconfigured occasion (e.g., ignored in non-preconfigured occasions). In some cases, if a dynamic indication (e.g., PDCCH) indicates that there is a retransmission in a time interval (e.g., a slot), a UE 115 may further decode a unicast scheduling transmission (e.g., over a PDCCH) for the retransmission data.

A dynamic scheduling indication may use the same indication for new data and a retransmission for a preconfigured data transmission. For example, if a dynamic indication (e.g., a PDCCH) indicates data is scheduled, a UE 115 may process both new data and retransmissions in preconfigured occasions, and the UE 115 may only process retransmissions in other time intervals (e.g., non-preconfigured time intervals) if the UE 115 is configured to receive retransmissions in other time intervals. In some examples, retransmission may not be allowed to be scheduled in preconfigured occasions. For example, if a dynamic indication indicates data is scheduled, a UE 115 may process new data in preconfigured occasions, and the UE 115 may process retransmissions in other time intervals where dynamic indications are monitored.

In some cases, separate dynamic indications (e.g., separate PDCCHs) may be used for new data and for retransmissions of the hybrid scheduling. For example, if a dynamic indication (e.g., over a PDCCH) indicates that data is scheduled, a UE 115 may process both new data and retransmissions in preconfigured occasions and may process retransmissions in other time intervals (e.g., non-preconfigured time intervals) if the UE 115 is configured to receive retransmissions in other time intervals. In some examples, retransmission may not be allowed to be scheduled in preconfigured occasions. For example, if a dynamic indication indicates data is scheduled, a UE 115 may process new data in preconfigured occasions and may process retransmissions in other time intervals where dynamic indications are monitored.

In some cases, dynamic indications (e.g., PDCCHs) may not indicate whether a retransmission of preconfigured data is scheduled in a slot or not. For example, the UE 115 may separately monitor unicast dynamic scheduling information (e.g., PDCCHs) that schedules retransmission. In some cases, a dynamic indication may indicate whether a dynamic indication for the release of the preconfiguration is transmitted.

In some examples, a dynamic indication may include control information in a compact fashion to improve system efficiency and reduce decoding resources. The dynamic indication may be scrambled by a RNTI that is different from an RNTI associated with a dynamic indication that activates the preconfigured scheduling. For example, the RNTI that scrambles the dynamic indication may be a power saving RNTI (PS-RNTI).

In some examples, the dynamic indication may be transmitted in a separate CORESET and/or a separate search space set that is different from the CORESET and/or search space associated with a PDCCH that is used for activating the preconfiguration scheduling.

The dynamic indication may be monitored at the beginning of a time internal (e.g., a slot). In some cases, a UE 115 may improve resource use efficiency by refraining from monitoring the dynamic indication outside of the beginning of a time interval. For example, a UE 115 may monitor for a dynamic indication in a search space set occasion within the first three symbols of the time interval.

In some cases, a threshold number (e.g., a maximum number) of downlink control channel (e.g., PDCCH) candidates for each aggregation level for the dynamic indication (e.g., PDCCH) may be defined by RRC search space set configuration. In some cases, the threshold number of downlink control candidates may be an integer number (e.g., 1, 2, or the like).

Figure 6:
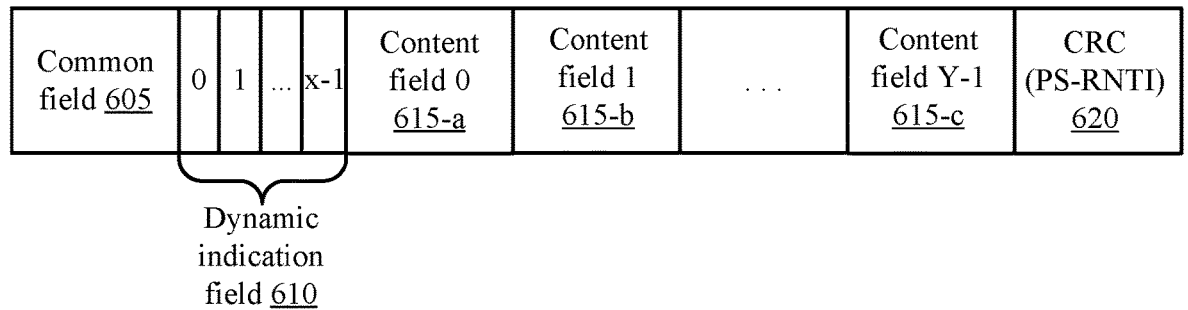
FIG. 6 illustrates an example of a control information message that supports hybrid scheduling techniques in accordance with aspects of the present disclosure.

FIG. 6 illustrates an example of a control information message 600 that supports hybrid scheduling techniques in accordance with aspects of the present disclosure. In some examples, control information message 600 may implement aspects of wireless communications systems 100 and 200. Control information message 600 may illustrate the format and the fields included within downlink control information that includes a dynamic scheduling indication for one or more UEs 115. As such, the control information message 600 may be an example of the dynamic scheduling indication described herein, and the control information message may likewise be used within a hybrid scheduling scheme to enable efficient communications.

In some cases, a dynamic indication (e.g., a PDCCH) may include (e.g., carry) a UE-specific DCI. In some cases, the dynamic indication may include a UE group-common DCI. For example, multiple UEs 115 may share a dynamic indication, and the dynamic indication may include information for one or more UEs 115. As such, a control information message included in a dynamic indication may include a common field 605 that common information for one or more UEs 115 (or for a group of UEs 115). In some cases, a dynamic indication field 610 may indicate whether there is data for a UE 115. In some examples, a content field 615 may indicate that there is data for a UE 115, or may include UE-specific information, or both. A dynamic indication field 610 may be associated with a content field 615 (e.g., where there may be a mapping between a dynamic indication field 610 and a content field 615), and the content field 615 may include or be otherwise associated with scheduling information for the UE 115. In some cases, a content field 615 may include other information for the UE 115, such as scheduling parameters that may be used to update or replace a set of previously-configured parameters, or may include additional information the UE 115 may use for transmitting/receiving data, or a combination thereof. In some cases, 'x' may indicate or otherwise correspond to a number of UEs 115 sharing the same dynamic indication (e.g., PDCCH). In some additional or alternative cases, 'Y' may indicate or otherwise correspond to a number of content fields. In some cases, 'Y' may be less than or equal to 'x.'

In some cases, the dynamic indication (e.g., PDCCH, DCI, compact DCI) may include one or more information of: a time-domain resource assignment (TDRA), a shift for a frequency-domain resource assignment (FDRA) (e.g., to enable frequency hopping), a physical uplink control channel (PUCCH) resource (e.g., for HARQ-ACK), a modulation and coding scheme (MCS), or HARQ feedback timing (e.g., $k_1$ value). The information (e.g., a TDRA) may be included or otherwise indicated by the dynamic indication to override the information (e.g., the TDRA) provided by the preconfiguration. As such, the scheduling information provided by the dynamic indication may alter the information provided by the preconfiguration. In some examples, the information provided by the dynamic indication (e.g., a FDRA shift) may be used to update the associated information (e.g., the FDRA) provided by the preconfiguration. As such, the dynamic indication may increase scheduling flexibility by supporting the modification of a preconfigured scheduling configuration (e.g., SPS). The control information message 600 may further include a number of CRC bits (e.g., CRC 620), that may be scrambled using an RNTI (e.g., a PS-RNTI, or some other RNTI that may be used for identifying that the control information message 600 is for one or more UEs 115).

Figure 7:
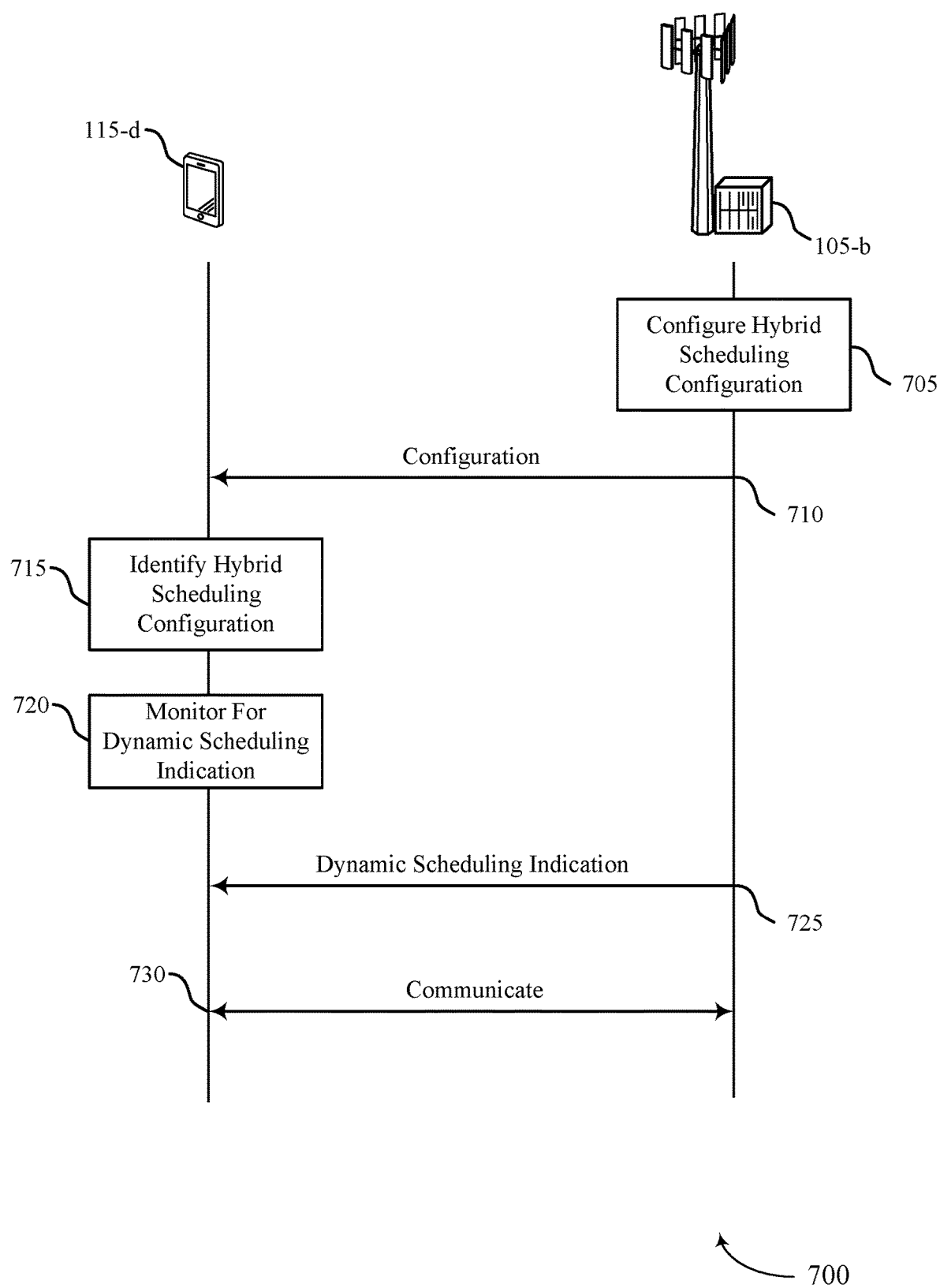
FIG. 7 illustrates an example of a process flow in a system that supports hybrid scheduling techniques in accordance with aspects of the present disclosure.

FIG. 7 illustrates an example of a process flow 700 in a system that supports hybrid scheduling techniques in accordance with aspects of the present disclosure. In some examples, process flow 700 may implement aspects of wireless communications system 100 and 200. The process flow 700 includes UE 115-d and base station 105-b. These may be examples of the corresponding device described with reference to FIGS. 1 through 6. UE 115-d and/or base station 105-b may implement hybrid scheduling techniques which may decrease UE 115-d power usage and improve communication efficiency. Alternative examples of the following may be implemented, where some steps are performed in a different order than described or are not performed at all. In some cases, steps may include additional features not mentioned below, or further steps may be added.

At 705, base station 105-b may configure a hybrid scheduling configuration that includes a dynamic scheduling indication, a preconfiguration including initial scheduling parameters, and a set of preconfigured occasions for communicating data (e.g., a periodicity and offset of time/frequency resources allocated for transmitting or receiving data). In some examples, base station 105-b may configure one or more scheduling parameters for one or more UEs 115 (e.g., including UE 115-d), where the one or more scheduling parameters include a time-domain resource assignment, an MCS, HARQ feedback timing, or a combination thereof.

At 710, base station 105-b may transmit, to the one or more UEs 115 (e.g., including UE 115-d), the dynamic scheduling indication based on the initial scheduling parameters and the set of preconfigured occasions. Additionally or alternatively, base station 105-b may transmit, to the one or more UEs 115, an indication of a periodicity and initial scheduling parameters for downlink transmissions (e.g., based on SPS), where the set of preconfigured occasions are based on the periodicity and the initial scheduling parameters for the downlink transmissions. In other examples, base station 105-b may transmit, to the one or more UEs 115, an indication of a periodicity and initial scheduling parameters for uplink transmissions (e.g., based on uplink configured grant), where the set of preconfigured occasions are based on the periodicity and the initial scheduling parameters for the downlink transmissions.

At 715, UE 115-d may identify a hybrid scheduling configuration. The hybrid scheduling configuration may, for example, include both the dynamic scheduling indication (e.g., a dynamic indication PDCCH) as well the preconfigured occasions for receiving and/or transmitting data.

At 720, UE 115-*d* may monitor for a dynamic scheduling indication. For example, UE 115-*d* may monitor one or more time intervals (e.g., transition time interval, slot, frame, sub-frame, symbol, or the like) for the dynamic scheduling indication. In some examples, the dynamic scheduling indication may be a DCI, a compact DCI, a PDCCH, or the like. In some examples, the dynamic indication may be monitored for only at the beginning of a time internal (e.g., a slot). For instance, the dynamic indication may be monitored in a search space set occasion within a first set of symbols (e.g., first three symbols) of the slot.

In some examples, at 725, base station 105-*b* may transmit, and UE 115-*d* may receive, the dynamic scheduling indication (e.g., over PDCCH). In some examples, the dynamic scheduling indication may be transmitted/received with some periodicity or may be transmitted/received in accordance with some pattern. In some cases, the dynamic scheduling indication may have a pattern that is the same as or different from a pattern of scheduling occasions indicated by the hybrid scheduling configuration. In some cases, the dynamic scheduling indication (e.g., over PDCCH) for activating the pre-configuration scheduling may be transmitted and received in a separate CORESET and/or separate search space set, that is different than those used for PDCCH. In some examples, the PDCCH carrying the dynamic scheduling indication may be scrambled by an RNTI that is different from the RNTI used to scramble the PDCCH that includes an activation of the pre-configured scheduling.

At 730, UE 115-*d* may communicate with base station 105-*b* based on receiving the dynamic scheduling indication. For example, the dynamic scheduling indication may assign or otherwise indicate network resources (e.g., one or more time intervals, one or more data channels, a coding scheme) for UE 115-*d* and/or base station 105-*b* to use for communication. In some cases, the dynamic scheduling indication may alter an existing communication configuration (e.g., alter a communication parameter), and the communication between UE 115-*d* and base station 105-*b* may be based on the altered communication configuration.

Figure 8:
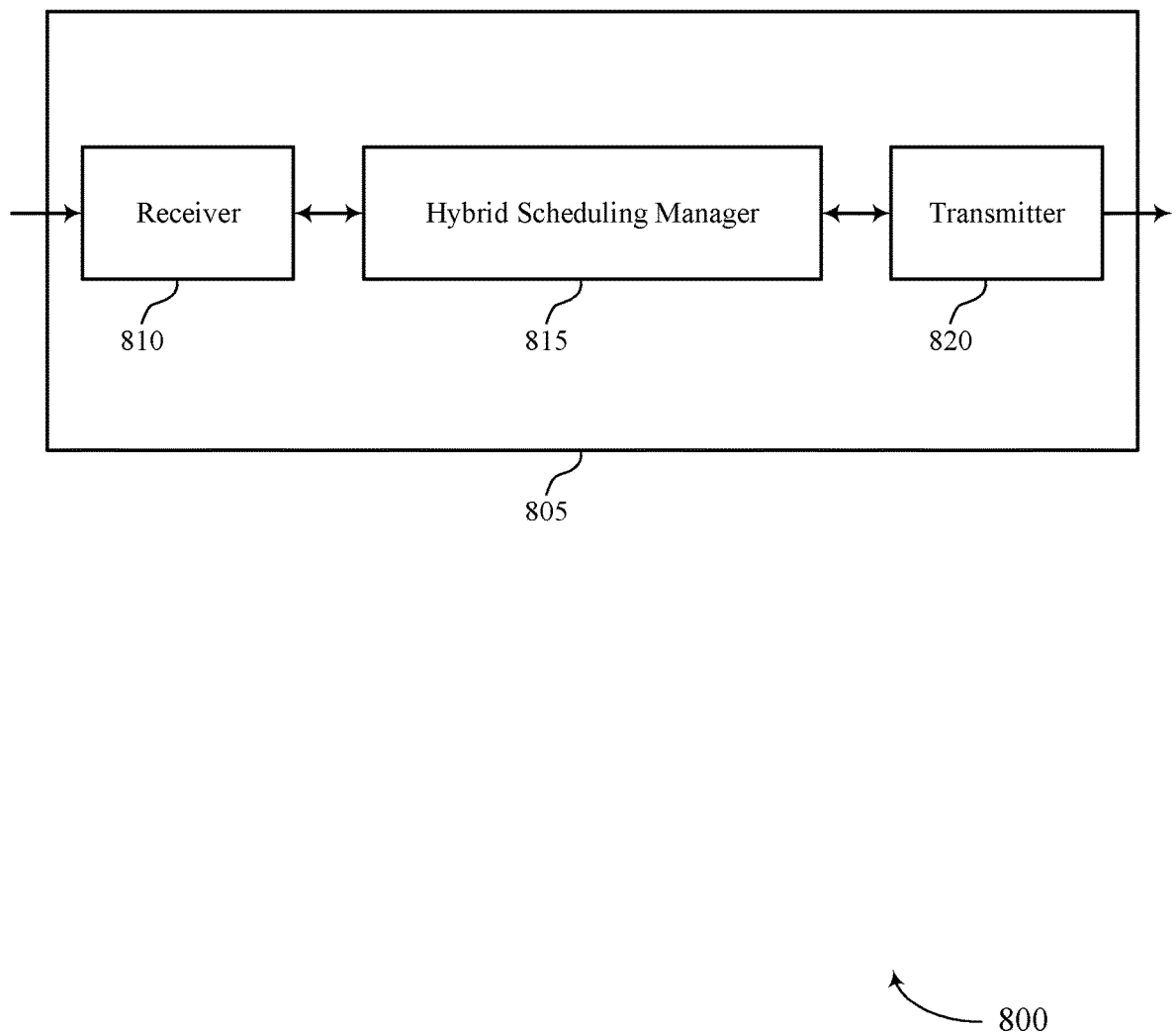
FIGS. 8 and 9 show block diagrams of devices that support hybrid scheduling techniques in accordance with aspects of the present disclosure.

FIG. 8 shows a block diagram 800 of a device 805 that supports hybrid scheduling techniques in accordance with aspects of the present disclosure. The device 805 may be an example of aspects of a UE 115 as described herein. The device 805 may include a receiver 810, a hybrid scheduling manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to hybrid scheduling techniques, etc.). Information may be passed on to other components of the device 805. The receiver 810 may be an example of aspects of the transceiver 1120 described with reference to FIG. 11. The receiver 810 may utilize a single antenna or a set of antennas.

The hybrid scheduling manager 815 may identify a hybrid scheduling configuration that includes a dynamic scheduling indication, a preconfiguration including initial scheduling parameters, and a set of preconfigured occasions for communicating data, monitor for the dynamic scheduling indication based on the initial scheduling parameters and the set of preconfigured occasions, and communicate with a base station based on receiving the dynamic scheduling indication. The hybrid scheduling manager 815 may be an example of aspects of the hybrid scheduling manager 1110 described herein.

The hybrid scheduling manager 815, or its sub-components, may be implemented in hardware, code (e.g., software or firmware) executed by a processor, or any combination thereof. If implemented in code executed by a processor, the functions of the hybrid scheduling manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The hybrid scheduling manager 815, or its sub-components, may be physically located at various positions, including being distributed such that portions of functions are implemented at different physical locations by one or more physical components. In some examples, the hybrid scheduling manager 815, or its sub-components, may be a separate and distinct component in accordance with various aspects of the present disclosure. In some examples, the hybrid scheduling manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
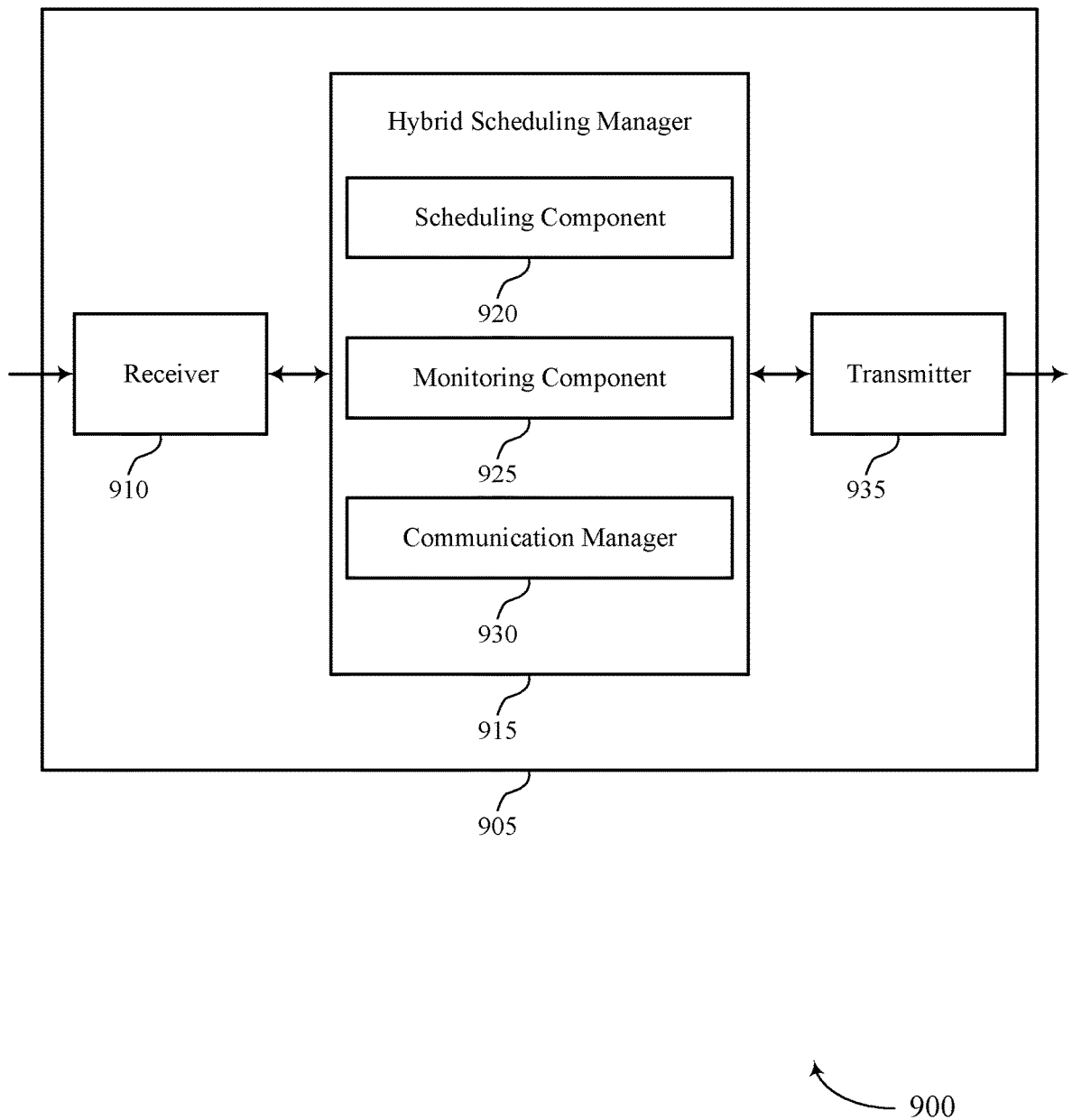

FIG. 9 shows a block diagram 900 of a device 905 that supports hybrid scheduling techniques in accordance with aspects of the present disclosure. The device 905 may be an example of aspects of a device 805, or a UE 115 as described herein. The device 905 may include a receiver 910, a hybrid scheduling manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to hybrid scheduling techniques, etc.). Information may be passed on to other components of the device 905. The receiver 910 may be an example of aspects of the transceiver 1120 described with reference to FIG. 11. The receiver 910 may utilize a single antenna or a set of antennas.

The hybrid scheduling manager 915 may be an example of aspects of the hybrid scheduling manager 815 as described herein. The hybrid scheduling manager 915 may include a scheduling component 920, a monitoring component 925, and a communication manager 930. The hybrid scheduling manager 915 may be an example of aspects of the hybrid scheduling manager 1110 described herein.

The scheduling component 920 may identify a hybrid scheduling configuration that includes a dynamic scheduling indication, a preconfiguration including initial scheduling parameters, and a set of preconfigured occasions for communicating data.

The monitoring component 925 may monitor for the dynamic scheduling indication based on the initial scheduling parameters and the set of preconfigured occasions. The communication manager 930 may communicate with a base station based on receiving the dynamic scheduling indication.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
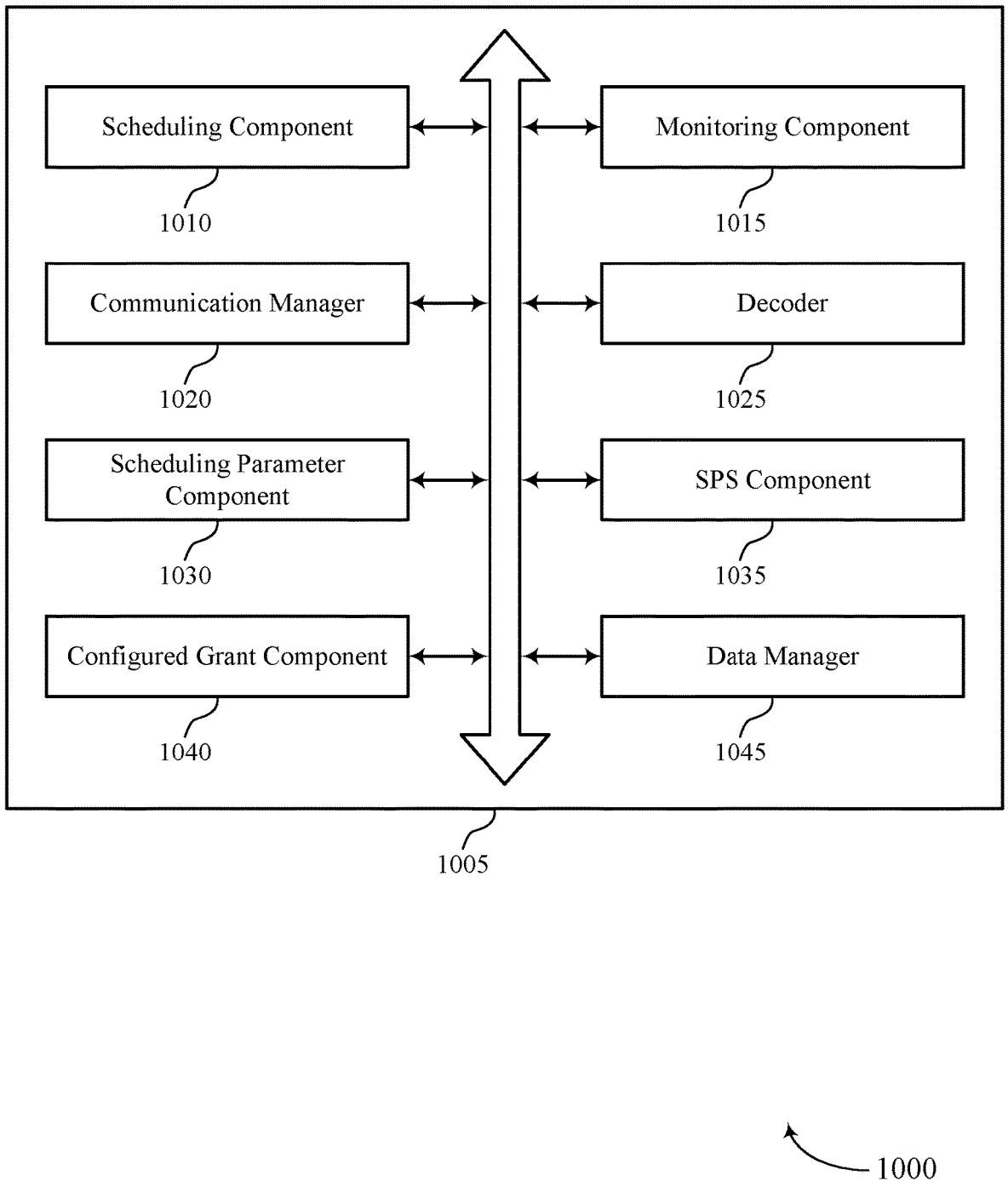
FIG. 10 shows a block diagram of a communications manager that supports hybrid scheduling techniques in accordance with aspects of the present disclosure.

FIG. 10 shows a block diagram 1000 of a hybrid scheduling manager 1005 that supports hybrid scheduling techniques in accordance with aspects of the present disclosure. The hybrid scheduling manager 1005 may be an example of aspects of a hybrid scheduling manager 815, a hybrid scheduling manager 915, or a hybrid scheduling manager 1110 described herein. The hybrid scheduling manager 1005 may include a scheduling component 1010, a monitoring component 1015, a communication manager 1020, a decoder 1025, a scheduling parameter component 1030, a SPS component 1035, a configured grant component 1040, and a data manager 1045. Each of these modules may communicate, directly or indirectly, with one another (e.g., via one or more buses).

The scheduling component 1010 may identify a hybrid scheduling configuration that includes a dynamic scheduling indication, a preconfiguration including initial scheduling parameters, and a set of preconfigured occasions for communicating data. In some examples, the scheduling component 1010 may receive the dynamic scheduling PDCCH. In some examples, the scheduling component 1010 may identify a control resource set and a search space set that configures the dynamic scheduling indication.

In some examples, the scheduling component 1010 may receive an indication that the first dynamic scheduling indication is associated with the first preconfigured occasion pattern and that the second dynamic scheduling indication is associated with the second preconfigured occasion pattern. In some examples, the scheduling component 1010 may identify two or more preconfigured occasion patterns for the set of preconfigured occasions, where the dynamic scheduling indication is associated with each of the two or more preconfigured occasion patterns.

In some examples, identifying, via the dynamic scheduling indication, an indication that a data transmission scheduled during a first time interval includes an original data transmission, or a retransmission of data, or a combination thereof. In some examples, identifying, via the dynamic scheduling indication, an indication that a data transmission scheduled during a first time interval includes an original data transmission.

In some examples, the scheduling component 1010 may receive, via the dynamic scheduling indication, an indication that a PDCCH that releases the set of preconfigured occasions is transmitted. In some examples, the scheduling component 1010 may identify a threshold (e.g., maximum) number of physical control channel candidates for respective aggregation levels for the dynamic scheduling indication based on a search space set configuration, where monitoring for the dynamic scheduling indication is based on the maximum number of physical control channel candidates.

In some examples, the scheduling component 1010 may identify, via the group-common DCI, a mapping of a content field included in the group-common DCI. In some examples, the scheduling component 1010 may receive, via the dynamic scheduling indication, one or more parameters that replace or modify the initial scheduling parameters.

In some cases, the indication is received via radio resource control signaling, via the dynamic scheduling indication, or a combination thereof. In some cases, the dynamic scheduling indication includes an indication of whether at least one of the two or more preconfigured occasion patterns includes a data transmission during a corresponding preconfigured occasion.

In some cases, the dynamic scheduling indication includes a respective indication of whether each of the two or more preconfigured occasion patterns includes a data transmission during a corresponding preconfigured occasion. In some cases, the dynamic scheduling indication includes a first PDCCH having a cyclic redundancy check scrambled by a first radio network temporary identifier that is different from a second radio network temporary identifier used to scramble a cyclic redundancy check of a second PDCCH for activating the set of preconfigured occasions.

In some cases, the first radio network temporary identifier includes a power saving radio network temporary identifier. In some cases, the dynamic scheduling indication is received in a first control resource set, or a first search space set, or both, that is different from a second control resource set, or a second search space set, or both, for a second PDCCH for activating the set of preconfigured occasions.

In some cases, the dynamic scheduling indication includes UE-specific DCI. In some cases, the one or more parameters include a time domain resource assignment, a frequency domain resource assignment shift; a physical uplink control channel resource, a modulation and coding scheme, a HARQ feedback timing, or a combination thereof.

The monitoring component 1015 may monitor for the dynamic scheduling indication based on the initial scheduling parameters and the set of preconfigured occasions. In some examples, the monitoring component 1015 may monitor for a dynamic scheduling PDCCH including DCI, the DCI having UE-specific information for one or more UEs.

In some examples, the monitoring component 1015 may identify one or more monitoring occasions for the dynamic scheduling indication, the one or more monitoring occasions coinciding with the set of preconfigured occasions, where monitoring for the dynamic scheduling indication is in accordance with the one or more monitoring occasions and the set of preconfigured occasions.

In some examples, the monitoring component 1015 may identify one or more monitoring occasions for the dynamic scheduling indication, where monitoring for the dynamic scheduling indication is performed during each monitoring occasion of the one or more monitoring occasions that corresponds to a preconfigured scheduling occasion of the set of preconfigured occasions.

In some examples, the monitoring component 1015 may identify one or more monitoring occasions for the dynamic scheduling indication, where monitoring for the dynamic scheduling indication is performed during each monitoring occasion of the one or more monitoring occasions that corresponds to a preconfigured scheduling occasion of the set of preconfigured occasions, and where the one or more monitoring occasions are based on a monitoring pattern indicated by a search space set configuration.

In some examples, the monitoring component 1015 may monitor for the dynamic scheduling indication during one or more monitoring occasions based on a monitoring pattern indicated by a search space set configuration.

In some examples, identifying two or more preconfigured occasion patterns for the set of preconfigured occasions, where a first dynamic scheduling indication is associated with a first preconfigured occasion pattern of the two or more preconfigured occasion patterns and a second dynamic scheduling indication is associated with a second preconfigured occasion pattern of the two or more preconfigured occasion patterns, and where monitoring for the dynamic scheduling indication includes.

In some examples, the monitoring component 1015 may monitor for at least one of the first dynamic scheduling indication or the second dynamic scheduling indication. In some examples, the monitoring component 1015 may monitor for a PDCCH that indicates a retransmission of data associated with the set of preconfigured occasions. In some examples, the monitoring component 1015 may monitor for the dynamic scheduling indication during a temporally first portion of each time interval corresponding to the set of preconfigured occasions.

In some cases, the set of preconfigured occasions include a subset of the one or more monitoring occasions. The communication manager 1020 may communicate with a base station based on receiving the dynamic scheduling indication. In some examples, the communication manager 1020 may receive the retransmission of the data based on the received PDCCH.

In some examples, the communication manager 1020 may receive, during the first time interval, at least one of the original data transmission or the retransmission in accordance with the set of preconfigured occasions, where another retransmission of data is received during a second time interval different from the first time interval.

In some examples, the communication manager 1020 may receive, during the first time interval, the original data transmission in accordance with the set of preconfigured occasions, where a retransmission of data is received during a second time interval different from the first time interval.

In some examples, the communication manager 1020 may receive the original data transmission and the retransmission of data based on the set of preconfigured occasions. In some examples, the communication manager 1020 may receive, during the first time interval, the original data transmission in accordance with the set of preconfigured occasions, where the second data transmission is received during the second time interval.

In some examples, the communication manager 1020 may receive the retransmission of data based on receiving the PDCCH. The decoder 1025 may decode the dynamic scheduling PDCCH to obtain scheduling information for one or more of the set of preconfigured occasions, where communicating with the base station is based on the scheduling information.

The scheduling parameter component 1030 may identify, via the DCI, one or more scheduling parameters, where the one or more scheduling parameters include a time-domain resource assignment, a modulation and coding scheme, a HARQ feedback timing, or a combination thereof. In some examples, the scheduling parameter component 1030 may identify a first set of parameters for monitoring for the dynamic scheduling indication based on the control resource set.

In some examples, the scheduling parameter component 1030 may identify a second set of parameters for monitoring for the dynamic scheduling indication based on the search space set, where the monitoring is based on the first set of parameters and the second set of parameters. In some cases, the first set of parameters includes frequency-domain resources for the dynamic scheduling indication and a duration of one or more symbols for monitoring for the dynamic scheduling indication.

In some cases, the second set of parameters includes a monitoring occasion periodicity, a monitoring occasion offset, a starting symbol for monitoring occasions, an aggregation level, a number of downlink control channel candidates for each aggregation level, or a combination thereof. The SPS component 1035 may receive, from the base station, an indication of a periodicity and initial scheduling parameters for downlink transmissions, where the set of preconfigured occasions are based on the periodicity and the initial scheduling parameters for the downlink transmissions.

The configured grant component 1040 may receive, from the base station, an indication of a periodicity and initial scheduling parameters for uplink transmissions, where the set of preconfigured occasions are based on the periodicity and the initial scheduling parameters for the uplink transmissions.

The data manager 1045 may identify, via the dynamic scheduling indication, an indication that a data transmission scheduled during an interval includes an original data transmission, or a retransmission of data associated with the set of preconfigured occasions, or a combination thereof. In some examples, the data manager 1045 may receive a PDCCH that indicates scheduling of the retransmission of the data associated with the set of preconfigured occasions.

In some examples, identifying, via a first dynamic scheduling indication, an indication that a first data transmission includes an original data transmission. In some examples, identifying, via a second dynamic scheduling indication, an indication that a second data transmission includes a retransmission of data. In some examples, identifying, via a first dynamic scheduling indication, an indication that a first data transmission scheduled during a first time interval includes an original data transmission.

In some examples, identifying, via a second dynamic scheduling indication, an indication that a second data transmission scheduled during a second time interval different from the first time interval includes a retransmission of data. In some cases, the original data transmission is scheduled in accordance with the set of preconfigured occasions.

Figure 11:
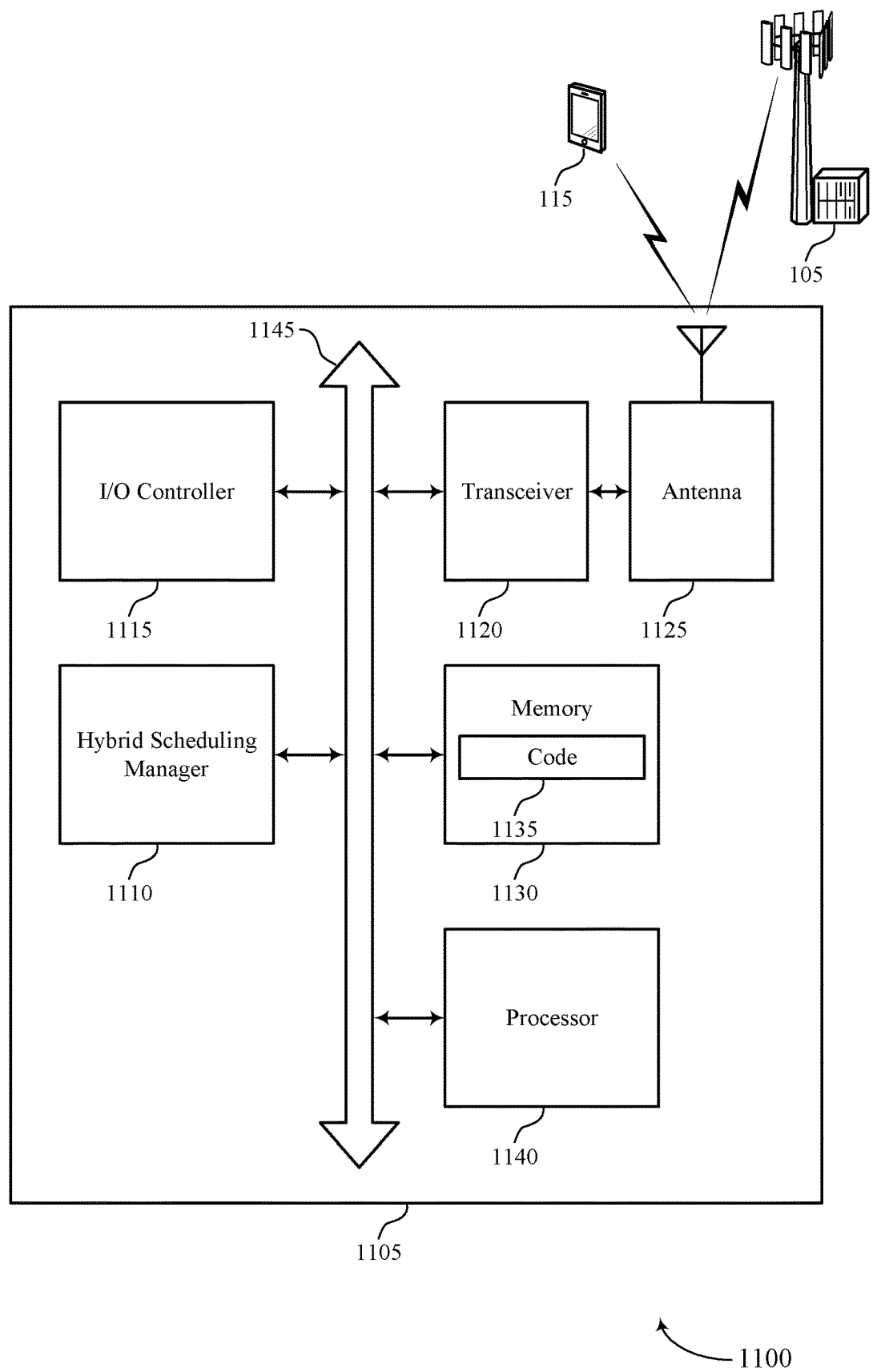
FIG. 11 shows a diagram of a system including a device that supports hybrid scheduling techniques in accordance with aspects of the present disclosure.

FIG. 11 shows a diagram of a system 1100 including a device 1105 that supports hybrid scheduling techniques in accordance with aspects of the present disclosure. The device 1105 may be an example of or include the components of device 805, device 905, or a UE 115 as described herein. The device 1105 may include components for bi-directional voice and data communications including components for transmitting and receiving communications, including a hybrid scheduling manager 1110, an I/O controller 1115, a transceiver 1120, an antenna 1125, memory 1130, and a processor 1140. These components may be in electronic communication via one or more buses (e.g., bus 1145).

The hybrid scheduling manager 1110 may identify a hybrid scheduling configuration that includes a dynamic scheduling indication, a preconfiguration including initial scheduling parameters, and a set of preconfigured occasions for communicating data, monitor for the dynamic scheduling indication based on the initial scheduling parameters and the set of preconfigured occasions, and communicate with a base station based on receiving the dynamic scheduling indication.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting hybrid scheduling techniques).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
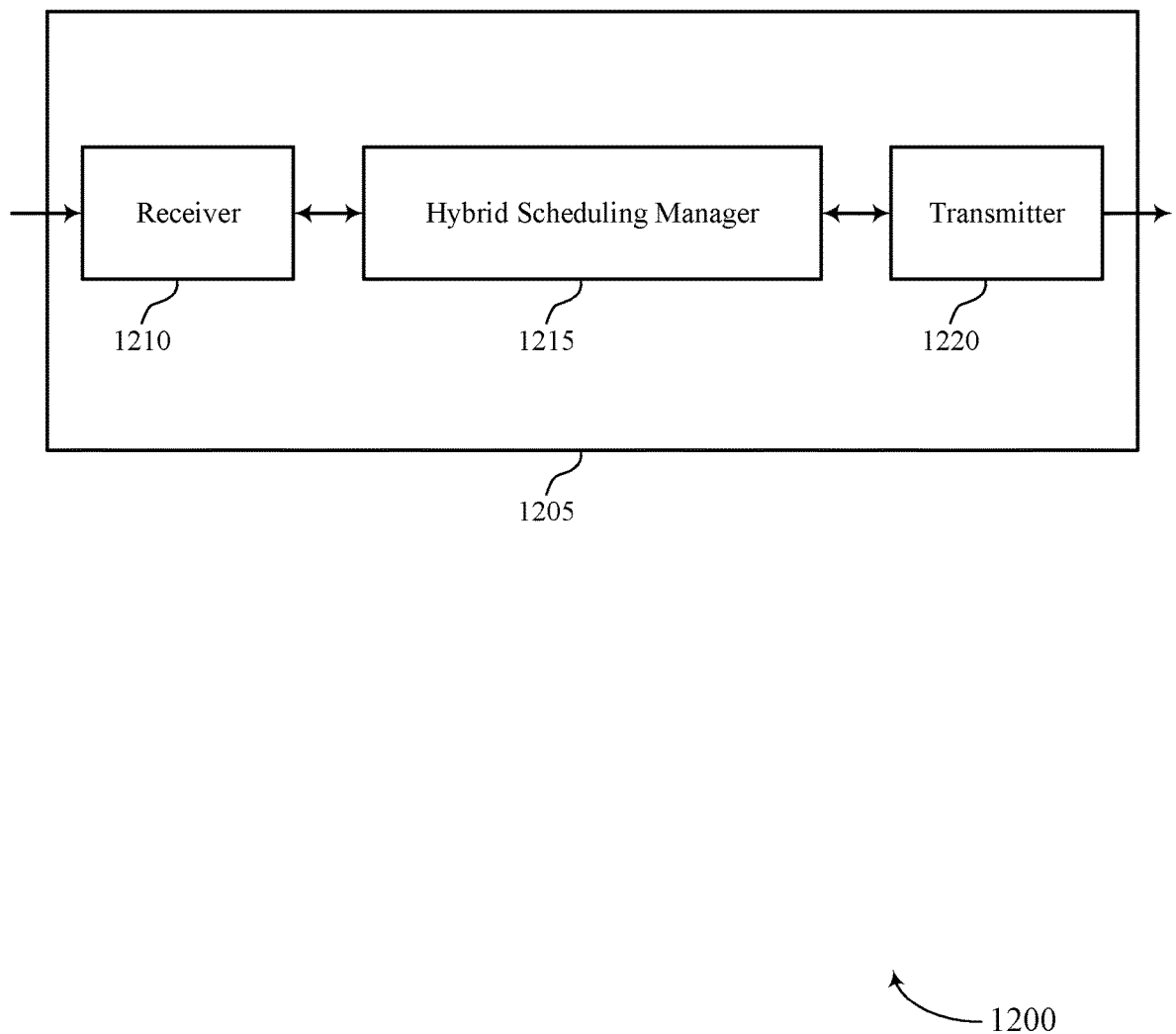
FIGS. 12 and 13 show block diagrams of devices that support hybrid scheduling techniques in accordance with aspects of the present disclosure.

FIG. 12 shows a block diagram 1200 of a device 1205 that supports hybrid scheduling techniques in accordance with aspects of the present disclosure. The device 1205 may be an example of aspects of a base station 105 as described herein. The device 1205 may include a receiver 1210, a hybrid scheduling manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to hybrid scheduling techniques, etc.). Information may be passed on to other components of the device 1205. The receiver 1210 may be an example of aspects of the transceiver 1520 described with reference to FIG. 15. The receiver 1210 may utilize a single antenna or a set of antennas.

The hybrid scheduling manager 1215 may configure a hybrid scheduling configuration that includes a dynamic scheduling indication, a preconfiguration including initial scheduling parameters, and a set of preconfigured occasions for communicating data, transmit, to one or more UEs, the dynamic scheduling indication based on the initial scheduling parameters and the set of preconfigured occasions, and communicate with the one or more UEs based on transmitting the dynamic scheduling indication. The hybrid scheduling manager 1215 may be an example of aspects of the hybrid scheduling manager 1510 described herein.

The hybrid scheduling manager 1215, or its sub-components, may be implemented in hardware, code (e.g., software or firmware) executed by a processor, or any combination thereof. If implemented in code executed by a processor, the functions of the hybrid scheduling manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The hybrid scheduling manager 1215, or its sub-components, may be physically located at various positions, including being distributed such that portions of functions are implemented at different physical locations by one or more physical components. In some examples, the hybrid scheduling manager 1215, or its sub-components, may be a separate and distinct component in accordance with various aspects of the present disclosure. In some examples, the hybrid scheduling manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
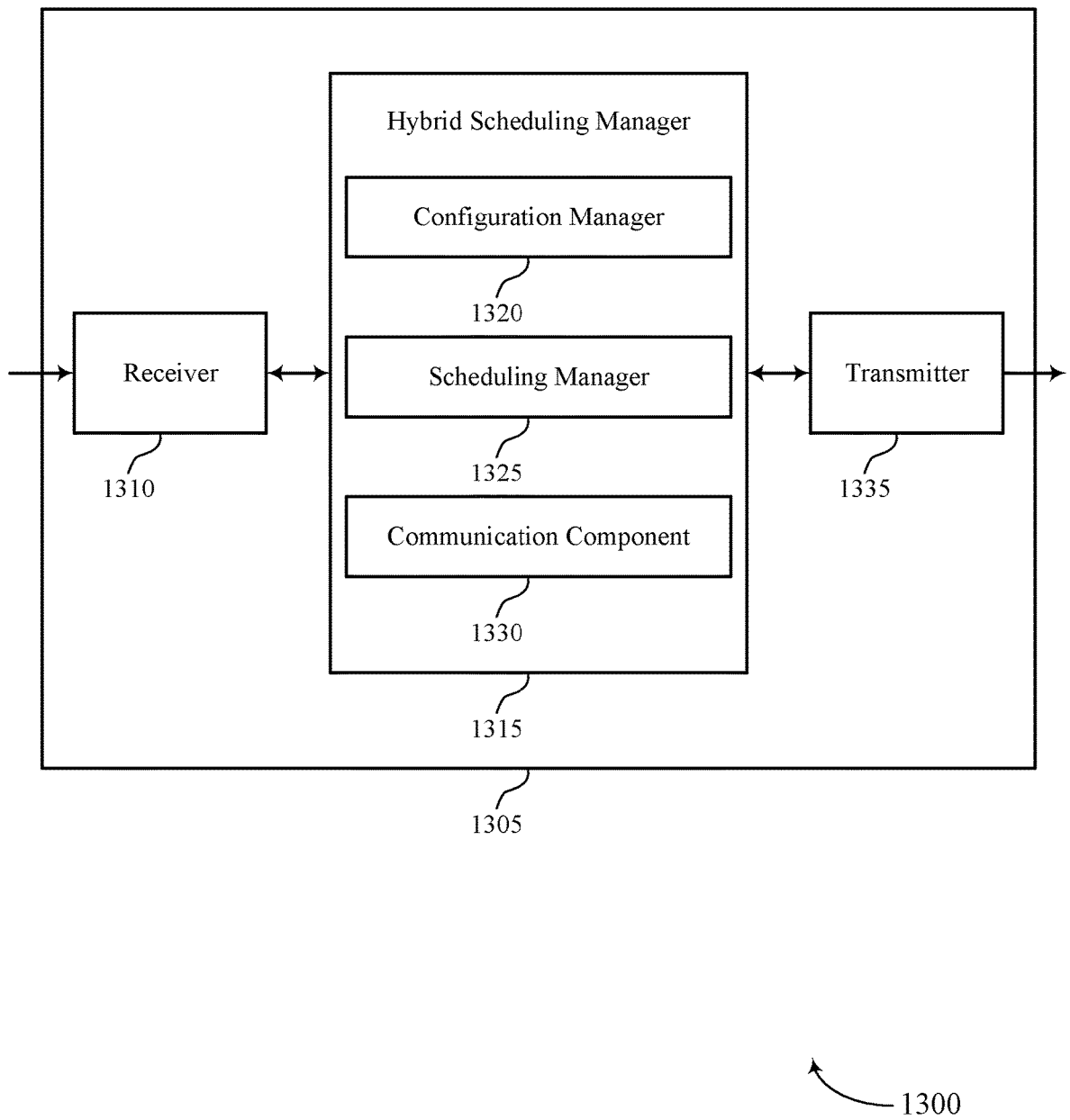

FIG. 13 shows a block diagram 1300 of a device 1305 that supports hybrid scheduling techniques in accordance with aspects of the present disclosure. The device 1305 may be an example of aspects of a device 1205, or a base station 105 as described herein. The device 1305 may include a receiver 1310, a hybrid scheduling manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to hybrid scheduling techniques, etc.). Information may be passed on to other components of the device 1305. The receiver 1310 may be an example of aspects of the transceiver 1520 described with reference to FIG. 15. The receiver 1310 may utilize a single antenna or a set of antennas.

The hybrid scheduling manager 1315 may be an example of aspects of the hybrid scheduling manager 1215 as described herein. The hybrid scheduling manager 1315 may include a configuration manager 1320, a scheduling manager 1325, and a communication component 1330. The hybrid scheduling manager 1315 may be an example of aspects of the hybrid scheduling manager 1510 described herein.

The configuration manager 1320 may configure a hybrid scheduling configuration that includes a dynamic scheduling indication, a preconfiguration including initial scheduling parameters, and a set of preconfigured occasions for communicating data.

The scheduling manager 1325 may transmit, to one or more UEs, the dynamic scheduling indication based on the initial scheduling parameters and the set of preconfigured occasions. The communication component 1330 may communicate with the one or more UEs based on transmitting the dynamic scheduling indication.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
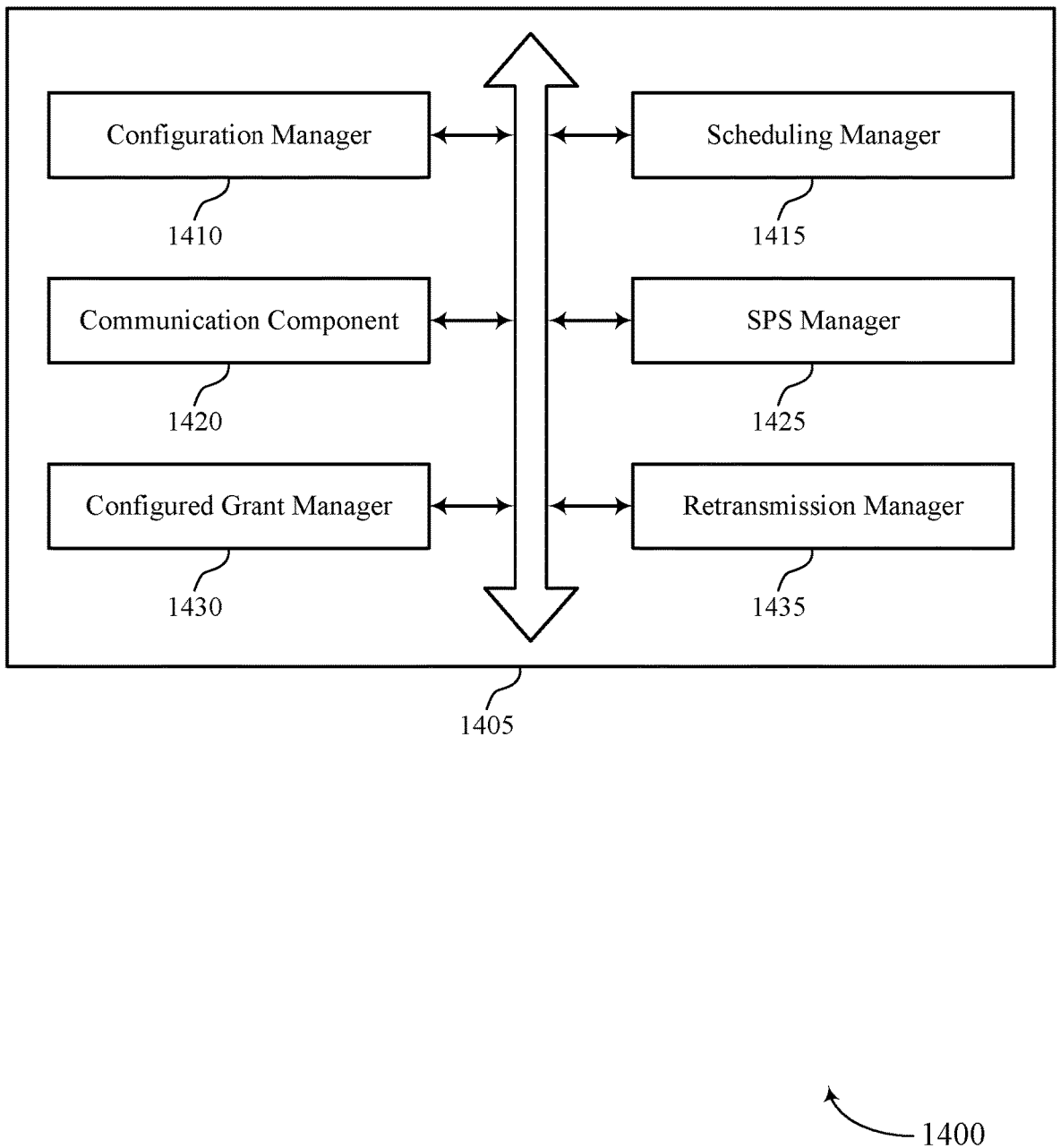
FIG. 14 shows a block diagram of a communications manager that supports hybrid scheduling techniques in accordance with aspects of the present disclosure.

FIG. 14 shows a block diagram 1400 of a hybrid scheduling manager 1405 that supports hybrid scheduling techniques in accordance with aspects of the present disclosure. The hybrid scheduling manager 1405 may be an example of aspects of a hybrid scheduling manager 1215, a hybrid scheduling manager 1315, or a hybrid scheduling manager 1510 described herein. The hybrid scheduling manager 1405 may include a configuration manager 1410, a scheduling manager 1415, a communication component 1420, a SPS manager 1425, a configured grant manager 1430, and a retransmission manager 1435. Each of these modules may communicate, directly or indirectly, with one another (e.g., via one or more buses).

The configuration manager 1410 may configure a hybrid scheduling configuration that includes a dynamic scheduling indication, a preconfiguration including initial scheduling parameters, and a set of preconfigured occasions for communicating data.

In some examples, the configuration manager 1410 may configure, via the DCI, one or more scheduling parameters for the one or more UEs, where the one or more scheduling parameters include a time-domain resource assignment, a modulation and coding scheme, a HARQ feedback timing, or a combination thereof.

In some examples, the configuration manager 1410 may identify a control resource set and a search space set that configure the dynamic scheduling indication. In some examples, the configuration manager 1410 may configure a first set of parameters for monitoring for the dynamic scheduling indication based on the control resource set. In some examples, the configuration manager 1410 may configure a second set of parameters for monitoring for the dynamic scheduling indication based on the search space set, where the monitoring is based on the first set of parameters and the second set of parameters.

In some examples, the configuration manager 1410 may configure one or more monitoring occasions for the dynamic scheduling indication, the one or more monitoring occasions coinciding with the set of preconfigured occasions, where the dynamic scheduling indication is transmitted in accordance with the one or more monitoring occasions and the set of preconfigured occasions.

In some examples, the configuration manager 1410 may configure one or more monitoring occasions for the dynamic scheduling indication, where the dynamic scheduling indication is transmitted during each monitoring occasion of the one or more monitoring occasions that corresponds to a preconfigured scheduling occasion of the set of preconfigured occasions.

In some examples, the configuration manager 1410 may configure one or more monitoring occasions for the dynamic scheduling indication, where the dynamic scheduling indication is transmitted during each monitoring occasion of the one or more monitoring occasions that corresponds to a preconfigured scheduling occasion of the set of preconfigured occasions, and where the one or more monitoring occasions are based on a monitoring pattern indicated by a search space set configuration.

In some examples, configuring two or more preconfigured occasion patterns for the set of preconfigured occasions, where a first dynamic scheduling indication is associated with a first preconfigured occasion pattern of the two or more preconfigured occasion patterns and a second dynamic scheduling indication is associated with a second preconfigured occasion pattern of the two or more preconfigured occasion patterns, and where transmitting the dynamic scheduling indication includes.

In some examples, the configuration manager 1410 may configure two or more preconfigured occasion patterns for the set of preconfigured occasions, where the dynamic scheduling indication is associated with each of the two or more preconfigured occasion patterns. In some examples, the configuration manager 1410 may configure a threshold (e.g., maximum) number of physical control channel candidates for respective aggregation levels for the dynamic scheduling indication based on a search space set configuration.

In some examples, the configuration manager 1410 may transmit an indication of the maximum number of physical control channel candidates to the one or more UEs.

In some cases, the first set of parameters includes frequency-domain resources for the dynamic scheduling indication and a duration of one or more symbols for monitoring for the dynamic scheduling indication. In some cases, the second set of parameters includes a monitoring occasion periodicity, a monitoring occasion offset, a starting symbol for monitoring occasions, an aggregation level, a number of downlink control channel candidates for each aggregation level, or a combination thereof.

The scheduling manager 1415 may transmit, to one or more UEs, the dynamic scheduling indication based on the initial scheduling parameters and the set of preconfigured occasions. In some examples, the scheduling manager 1415 may transmit a dynamic scheduling PDCCH including DCI, the DCI having UE-specific information for each of the one or more UEs.

In some examples, the scheduling manager 1415 may transmit the dynamic scheduling indication during one or more monitoring occasions based on a monitoring pattern indicated by a search space set configuration. In some examples, the scheduling manager 1415 may transmit at least one of the first dynamic scheduling indication or the second dynamic scheduling indication.

In some examples, the scheduling manager 1415 may transmit an indication that the first dynamic scheduling indication is associated with the first preconfigured occasion pattern and that the second dynamic scheduling indication is associated with the second preconfigured occasion pattern.

In some examples, transmitting, via the dynamic scheduling indication, an indication that a data transmission scheduled during a time interval includes an original data transmission, or a retransmission of data associated with the set of preconfigured occasions, or a combination thereof.

In some examples, transmitting, via the dynamic scheduling indication, an indication that a data transmission scheduled during a first time interval includes an original data transmission, or a retransmission of data, or a combination thereof.

In some examples, transmitting, via the dynamic scheduling indication, an indication that a data transmission scheduled during a first time interval includes an original data transmission. In some examples, transmitting, via a first dynamic scheduling indication, an indication that a first data transmission includes an original data transmission. In some examples, transmitting, via a second dynamic scheduling indication, an indication that a second data transmission includes a retransmission of data.

In some examples, transmitting, via a first dynamic scheduling indication, an indication that a first data transmission scheduled during a first time interval includes an original data transmission. In some examples, transmitting, via a second dynamic scheduling indication, an indication that a second data transmission scheduled during a second time interval different from the first time interval includes a retransmission of data.

In some examples, the scheduling manager 1415 may transmit, via the dynamic scheduling indication, an indication that a PDCCH that releases the set of preconfigured occasions is transmitted. In some examples, the scheduling manager 1415 may transmit the dynamic scheduling indication during a temporally first portion of each time interval corresponding to the set of preconfigured occasions.

In some examples, the scheduling manager 1415 may transmit, via the group-common DCI, a mapping of a content field included in the group-common DCI. In some examples, the scheduling manager 1415 may transmit, via the dynamic scheduling indication, one or more parameters that replace or modify the initial scheduling parameters.

In some cases, the set of preconfigured occasions include a subset of the one or more monitoring occasions. In some cases, the indication is transmitted via radio resource control signaling, via the dynamic scheduling indication, or a combination thereof. In some cases, the dynamic scheduling indication includes an indication of whether at least one of the two or more preconfigured occasion patterns includes a data transmission during a corresponding preconfigured occasion.

In some cases, the dynamic scheduling indication includes a respective indication of whether each of the two or more preconfigured occasion patterns includes a data transmission during a corresponding preconfigured occasion. In some cases, the original data transmission is scheduled in accordance with the set of preconfigured occasions.

In some cases, the dynamic scheduling indication includes a first PDCCH having a cyclic redundancy check scrambled by a first radio network temporary identifier that is different from a second radio network temporary identifier used to scramble a cyclic redundancy check of a second PDCCH for activating the set of preconfigured occasions. In some cases, the first radio network temporary identifier includes a power saving radio network temporary identifier.

In some cases, the dynamic scheduling indication is transmitted in a first control resource set, or a first search space set, or both, that is different from a second control resource set, or a second search space set, or both, for a second PDCCH for activating the set of preconfigured occasions.

In some cases, the dynamic scheduling indication includes UE-specific DCI. In some cases, the one or more parameters include a time domain resource assignment, a frequency domain resource assignment shift; a physical uplink control channel resource, a modulation and coding scheme, a HARQ feedback timing, or a combination thereof. The communication component 1420 may communicate with the one or more UEs based on transmitting the dynamic scheduling indication.

In some examples, the communication component 1420 may transmit, during the first time interval, at least one of the original data transmission or the retransmission in accordance with the set of preconfigured occasions, where another retransmission of data is transmitted during a second time interval different from the first time interval.

In some examples, the communication component 1420 may transmit, during the first time interval, the original data transmission in accordance with the set of preconfigured occasions, where a retransmission of data is transmitted during a second time interval different from the first time interval. In some examples, the communication component 1420 may transmit the original data transmission and the retransmission of data based on the set of preconfigured occasions. In some examples, the communication component 1420 may transmit, during the first time interval, the original data transmission in accordance with the set of preconfigured occasions.

The SPS manager 1425 may transmit, to the one or more UEs, an indication of a periodicity and initial scheduling parameters for downlink transmissions, where the set of preconfigured occasions are based on the periodicity and the initial scheduling parameters for the downlink transmissions. The configured grant manager 1430 may transmit, to the one or more UEs, an indication of a periodicity and initial scheduling parameters for uplink transmissions, where the set of preconfigured occasions are based on the periodicity and the initial scheduling parameters for the uplink transmissions.

The retransmission manager 1435 may transmit a PDCCH that indicates scheduling of the retransmission of the data associated with the set of preconfigured occasions. In some examples, the retransmission manager 1435 may transmit the retransmission of the data based on the transmitted PDCCH. In some examples, the retransmission manager 1435 may transmit a PDCCH that indicates a retransmission of data associated with the set of preconfigured occasions.

In some examples, the retransmission manager 1435 may transmit the retransmission of data based on receiving the PDCCH, where the retransmission of data is transmitted during occasions that are different from the set of preconfigured occasions.

Figure 15:
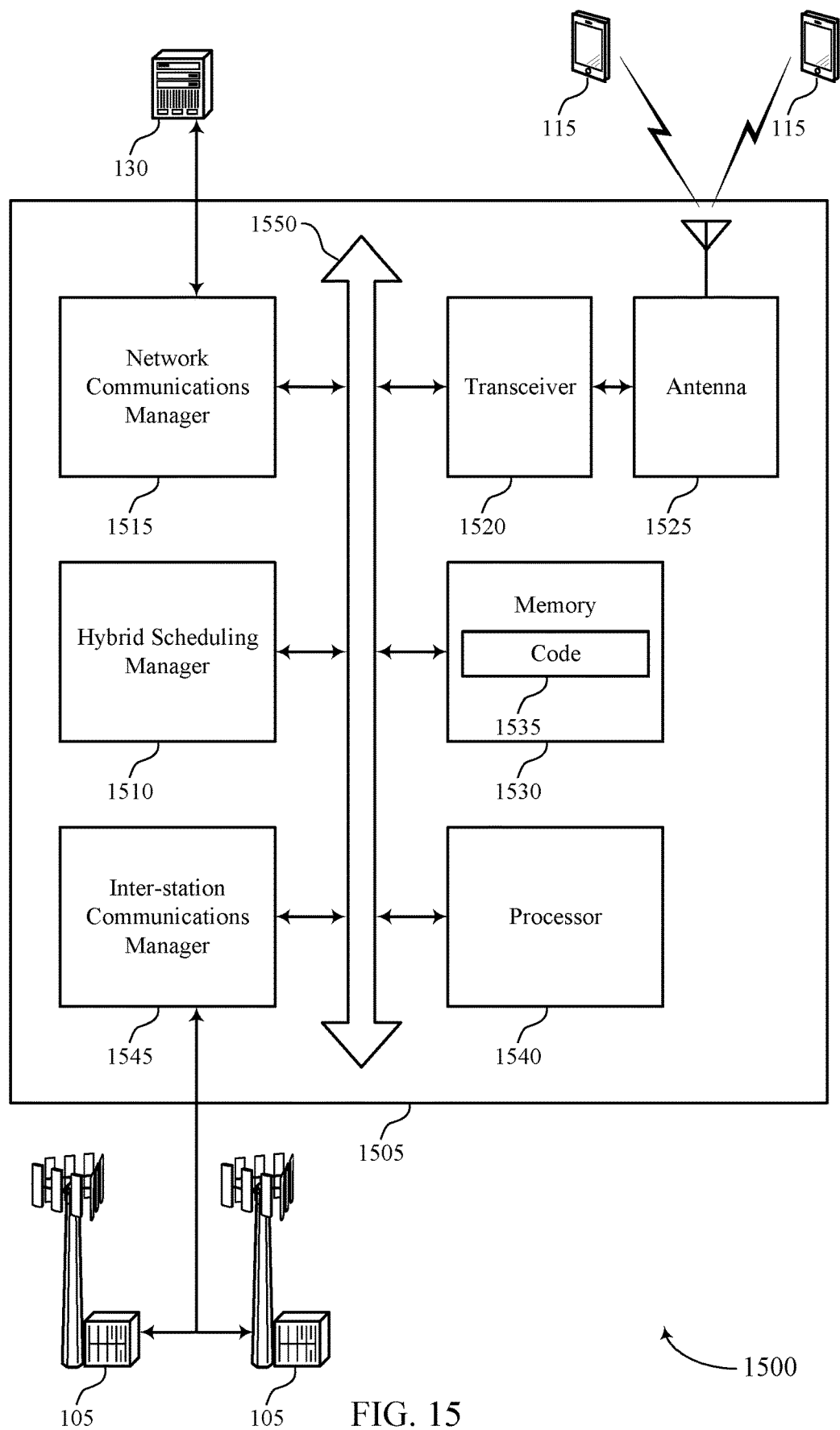
FIG. 15 shows a diagram of a system including a device that supports hybrid scheduling techniques in accordance with aspects of the present disclosure.

FIG. 15 shows a diagram of a system 1500 including a device 1505 that supports hybrid scheduling techniques in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a hybrid scheduling manager 1510, a network communications manager 1515, a transceiver 1520, an antenna 1525, memory 1530, a processor 1540, and an inter-station communications manager 1545. These components may be in electronic communication via one or more buses (e.g., bus 1550).

The hybrid scheduling manager 1510 may configure a hybrid scheduling configuration that includes a dynamic scheduling indication, a preconfiguration including initial scheduling parameters, and a set of preconfigured occasions for communicating data, transmit, to one or more UEs, the dynamic scheduling indication based on the initial scheduling parameters and the set of preconfigured occasions, and communicate with the one or more UEs based on transmitting the dynamic scheduling indication.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting hybrid scheduling techniques).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
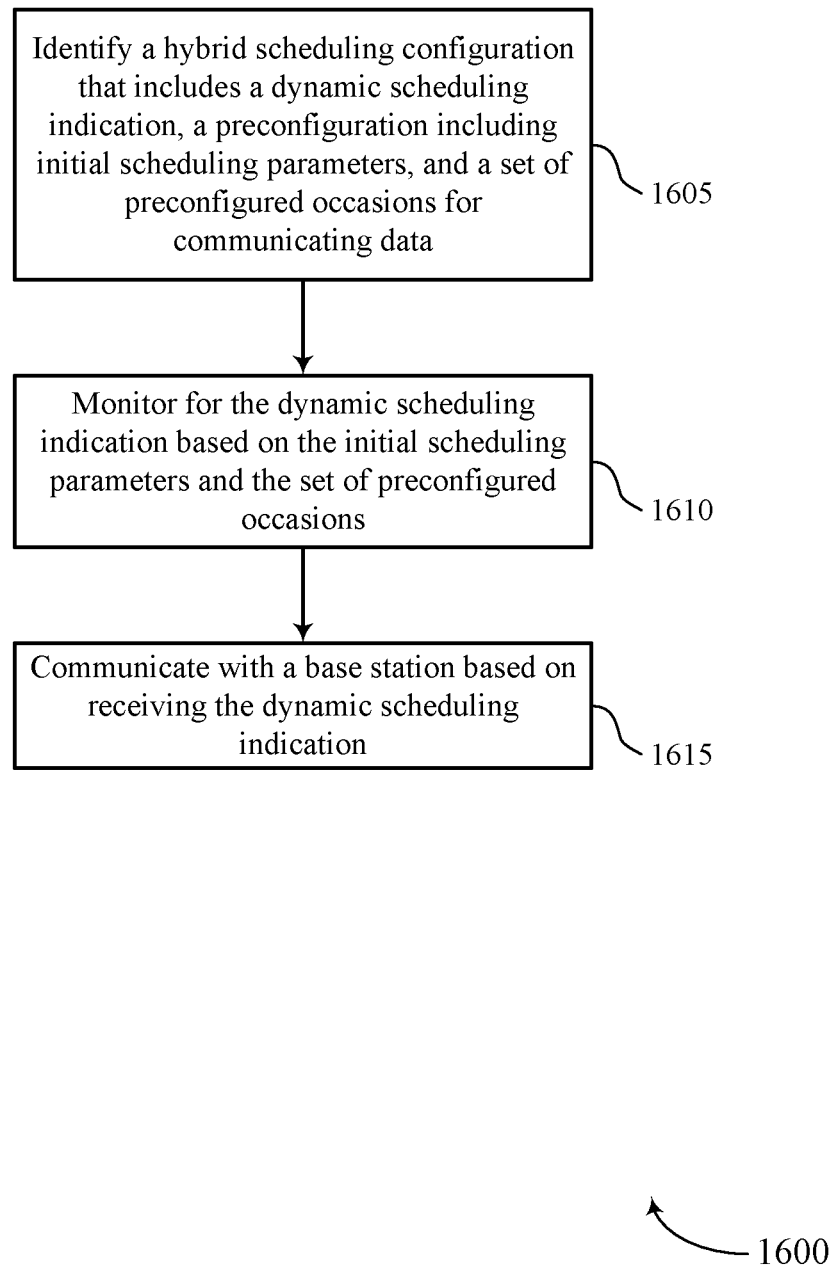
FIGS. 16 through 19 show flowcharts illustrating methods that support hybrid scheduling techniques in accordance with aspects of the present disclosure.

FIG. 16 shows a flowchart illustrating a method 1600 that supports hybrid scheduling techniques in accordance with aspects of the present disclosure. The operations of method 1600 may be implemented by a UE 115 or its components as described herein. For example, the operations of method 1600 may be performed by a hybrid scheduling manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may identify a hybrid scheduling configuration that includes a dynamic scheduling indication, a preconfiguration including initial scheduling parameters, and a set of preconfigured occasions for communicating data. The operations of 1605 may be performed according to the methods described herein. In some examples, aspects of the operations of 1605 may be performed by a scheduling component as described with reference to FIGS. 8 through 11.

At 1610, the UE may monitor for the dynamic scheduling indication based on the initial scheduling parameters and the set of preconfigured occasions. The operations of 1610 may be performed according to the methods described herein. In some examples, aspects of the operations of 1610 may be performed by a monitoring component as described with reference to FIGS. 8 through 11.

At 1615, the UE may communicate with a base station based on receiving the dynamic scheduling indication. The operations of 1615 may be performed according to the methods described herein. In some examples, aspects of the operations of 1615 may be performed by a communication manager as described with reference to FIGS. 8 through 11.

Figure 17:
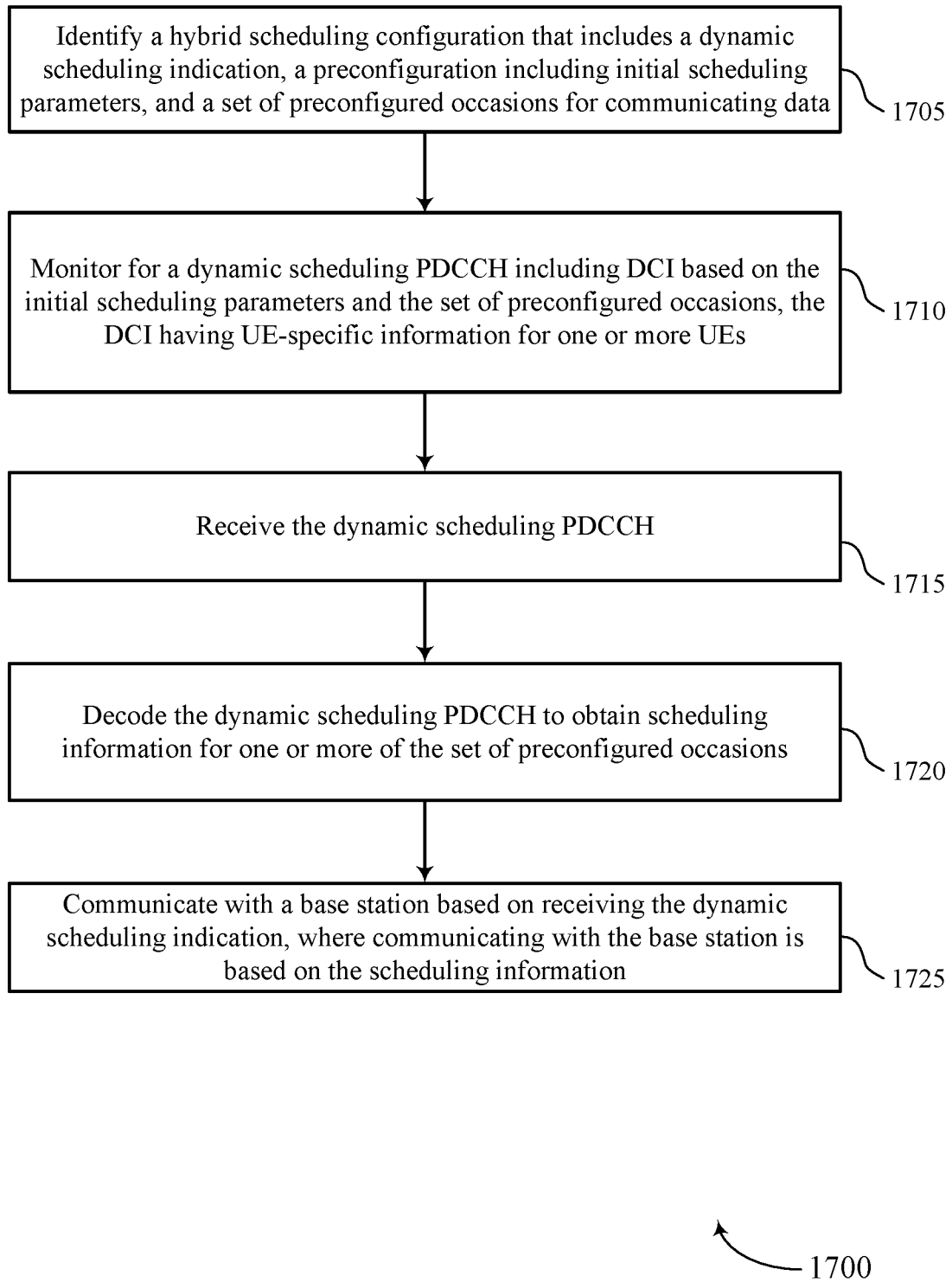

FIG. 17 shows a flowchart illustrating a method 1700 that supports hybrid scheduling techniques in accordance with aspects of the present disclosure. The operations of method 1700 may be implemented by a UE 115 or its components as described herein. For example, the operations of method 1700 may be performed by a hybrid scheduling manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may identify a hybrid scheduling configuration that includes a dynamic scheduling indication, a preconfiguration including initial scheduling parameters, and a set of preconfigured occasions for communicating data. The operations of 1705 may be performed according to the methods described herein. In some examples, aspects of the operations of 1705 may be performed by a scheduling component as described with reference to FIGS. 8 through 11.

At 1710, the UE may monitor for a dynamic scheduling PDCCH including DCI, the DCI having UE-specific information for one or more UEs. The operations of 1715 may be performed according to the methods described herein. In some examples, aspects of the operations of 1715 may be performed by a monitoring component as described with reference to FIGS. 8 through 11.

At 1715, the UE may receive the dynamic scheduling PDCCH. The operations of 1715 may be performed according to the methods described herein. In some examples, aspects of the operations of 1715 may be performed by a scheduling component as described with reference to FIGS. 8 through 11.

At 1720, the UE may decode the dynamic scheduling PDCCH to obtain scheduling information for one or more of the set of preconfigured occasions. The operations of 1720 may be performed according to the methods described herein. In some examples, aspects of the operations of 1720 may be performed by a decoder as described with reference to FIGS. 8 through 11.

At 1725, the UE may communicate with a base station based on receiving the dynamic scheduling indication, where communicating with the base station is based on the scheduling information. The operations of 1725 may be performed according to the methods described herein. In some examples, aspects of the operations of 1725 may be performed by a communication manager as described with reference to FIGS. 8 through 11.

Figure 18:
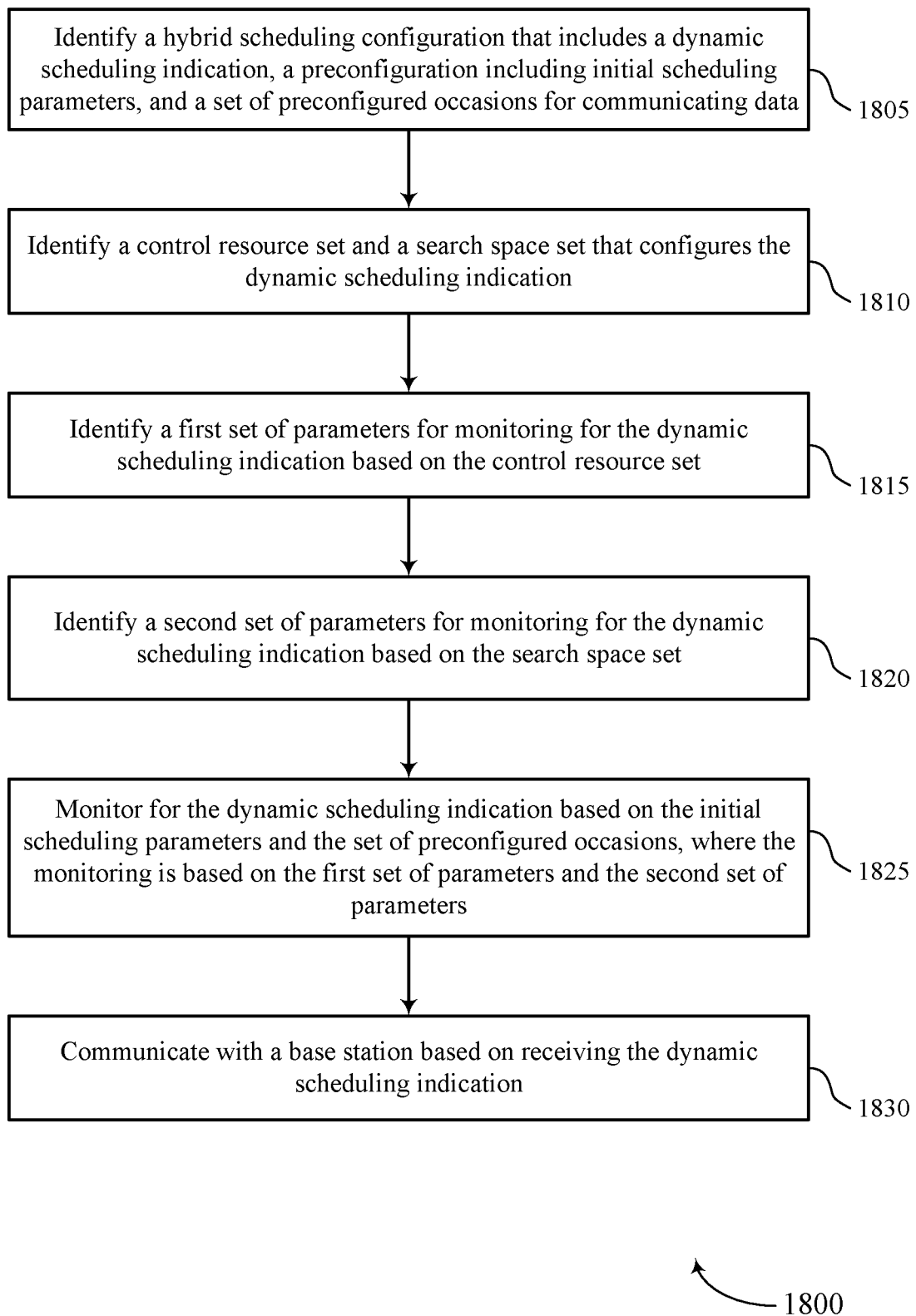

FIG. 18 shows a flowchart illustrating a method 1800 that supports hybrid scheduling techniques in accordance with aspects of the present disclosure. The operations of method 1800 may be implemented by a UE 115 or its components as described herein. For example, the operations of method 1800 may be performed by a hybrid scheduling manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1805, the UE may identify a hybrid scheduling configuration that includes a dynamic scheduling indication, a preconfiguration including initial scheduling parameters, and a set of preconfigured occasions for communicating data. The operations of 1805 may be performed according to the methods described herein. In some examples, aspects of the operations of 1805 may be performed by a scheduling component as described with reference to FIGS. 8 through 11.

At 1810, the UE may identify a control resource set and a search space set that configures the dynamic scheduling indication. The operations of 1810 may be performed according to the methods described herein. In some examples, aspects of the operations of 1810 may be performed by a scheduling component as described with reference to FIGS. 8 through 11.

At 1815, the UE may identify a first set of parameters for monitoring for the dynamic scheduling indication based on the control resource set. The operations of 1815 may be performed according to the methods described herein. In some examples, aspects of the operations of 1815 may be performed by a scheduling parameter component as described with reference to FIGS. 8 through 11.

At 1820, the UE may identify a second set of parameters for monitoring for the dynamic scheduling indication based on the search space set. The operations of 1820 may be performed according to the methods described herein. In some examples, aspects of the operations of 1820 may be performed by a scheduling parameter component as described with reference to FIGS. 8 through 11.

At 1825, the UE may monitor for the dynamic scheduling indication based on the initial scheduling parameters and the set of preconfigured occasions, where the monitoring is based on the first set of parameters and the second set of parameters. The operations of 1825 may be performed according to the methods described herein. In some examples, aspects of the operations of 1825 may be performed by a monitoring component as described with reference to FIGS. 8 through 11.

At 1830, the UE may communicate with a base station based on receiving the dynamic scheduling indication. The operations of 1830 may be performed according to the methods described herein. In some examples, aspects of the operations of 1830 may be performed by a communication manager as described with reference to FIGS. 8 through 11.

Figure 19:
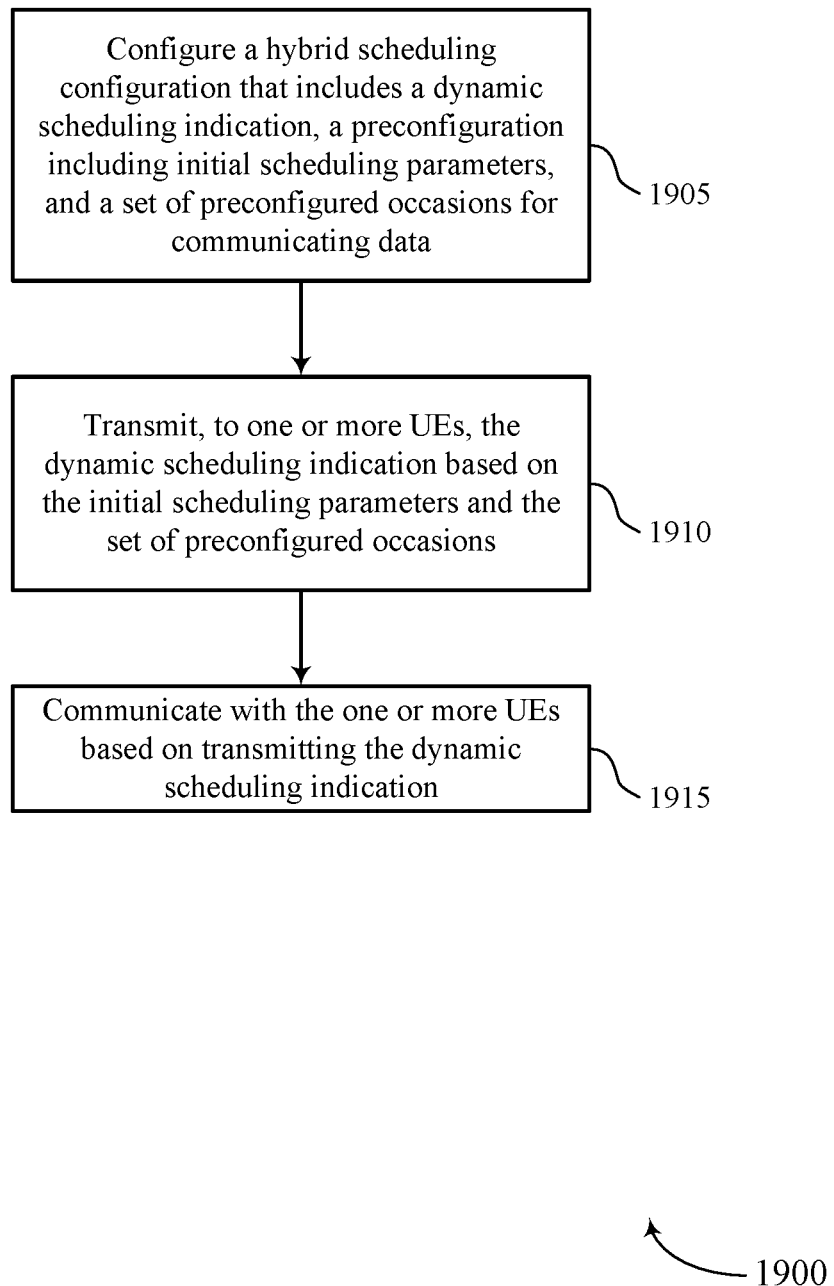

FIG. 19 shows a flowchart illustrating a method 1900 that supports hybrid scheduling techniques in accordance with aspects of the present disclosure. The operations of method 1900 may be implemented by a base station 105 or its components as described herein. For example, the operations of method 1900 may be performed by a hybrid scheduling manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may configure a hybrid scheduling configuration that includes a dynamic scheduling indication, a preconfiguration including initial scheduling parameters, and a set of preconfigured occasions for communicating data. The operations of 1905 may be performed according to the methods described herein. In some examples, aspects of the operations of 1905 may be performed by a configuration manager as described with reference to FIGS. 12 through 15.

At 1910, the base station may transmit, to one or more UEs, the dynamic scheduling indication based on the initial scheduling parameters and the set of preconfigured occasions. The operations of 1910 may be performed according to the methods described herein. In some examples, aspects of the operations of 1910 may be performed by a scheduling manager as described with reference to FIGS. 12 through 15.

At 1915, the base station may communicate with the one or more UEs based on transmitting the dynamic scheduling indication. The operations of 1915 may be performed according to the methods described herein. In some examples, aspects of the operations of 1915 may be performed by a communication component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: identifying a hybrid scheduling configuration that comprises a dynamic scheduling indication, a preconfiguration comprising initial scheduling parameters, and a plurality of preconfigured occasions for communicating data; monitoring for the dynamic scheduling indication based at least in part on the initial scheduling parameters and the plurality of preconfigured occasions; and communicating with a base station based at least in part on receiving the dynamic scheduling indication.

Aspect 2: The method of aspect 1, wherein monitoring for the dynamic scheduling indication comprises: monitoring for a dynamic scheduling physical downlink control channel including downlink control information, the downlink control information having UE-specific information for one or more UEs.

Aspect 3: The method of aspect 2, further comprising: receiving the dynamic scheduling physical downlink control channel; and decoding the dynamic scheduling physical downlink control channel to obtain scheduling information for one or more of the plurality of preconfigured occasions, wherein communicating with the base station is based at least in part on the scheduling information.

Aspect 4: The method of any of aspects 2 through 3, further comprising: identifying, via the downlink control information, one or more scheduling parameters, wherein the one or more scheduling parameters comprise a time-domain resource assignment, a modulation and coding scheme, an HARQ feedback timing, or a combination thereof.

Aspect 5: The method of any of aspects 1 through 4, further comprising: receiving, from the base station, an indication of a periodicity and initial scheduling parameters for downlink transmissions, wherein the plurality of preconfigured occasions are based at least in part on the periodicity and the initial scheduling parameters for the downlink transmissions.

Aspect 6: The method of any of aspects 1 through 5, further comprising: receiving, from the base station, an indication of a periodicity and initial scheduling parameters for uplink transmissions, wherein the plurality of preconfigured occasions are based at least in part on the periodicity and the initial scheduling parameters for the uplink transmissions.

Aspect 7: The method of any of aspects 1 through 6, further comprising: identifying a control resource set and a search space set that configure the dynamic scheduling indication; identifying a first set of parameters for monitoring for the dynamic scheduling indication based at least in part on the control resource set; and identifying a second set of parameters for monitoring for the dynamic scheduling indication based at least in part on the search space set, wherein the monitoring is based at least in part on the first set of parameters and the second set of parameters.

Aspect 8: The method of aspect 7, wherein the first set of parameters comprises frequency-domain resources for the dynamic scheduling indication and a duration of one or more symbols for monitoring for the dynamic scheduling indication; and the second set of parameters comprises a monitoring occasion periodicity, a monitoring occasion offset, a starting symbol for monitoring occasions, an aggregation level, a number of downlink control channel candidates for each aggregation level, or a combination thereof.

Aspect 9: The method of any of aspects 1 through 8, further comprising: identifying one or more monitoring occasions for the dynamic scheduling indication, the one or more monitoring occasions coinciding with the plurality of preconfigured occasions, wherein monitoring for the dynamic scheduling indication is in accordance with the one or more monitoring occasions and the plurality of preconfigured occasions.

Aspect 10: The method of any of aspects 1 through 9, further comprising: identifying one or more monitoring occasions for the dynamic scheduling indication, wherein monitoring for the dynamic scheduling indication is performed during each monitoring occasion of the one or more monitoring occasions that corresponds to a preconfigured scheduling occasion of the plurality of preconfigured occasions.

Aspect 11: The method of any of aspects 1 through 10, further comprising: identifying one or more monitoring occasions for the dynamic scheduling indication, wherein monitoring for the dynamic scheduling indication is performed during each monitoring occasion of the one or more monitoring occasions that corresponds to a preconfigured scheduling occasion of the plurality of preconfigured occasions, and wherein the one or more monitoring occasions are based at least in part on a monitoring pattern indicated by a search space set configuration.

Aspect 12: The method of any of aspects 1 through 11, wherein monitoring for the dynamic scheduling indication comprises: monitoring for the dynamic scheduling indication during one or more monitoring occasions based at least in part on a monitoring pattern indicated by a search space set configuration.

Aspect 13: The method of aspect 12, wherein the plurality of preconfigured occasions comprise a subset of the one or more monitoring occasions.

Aspect 14: The method of any of aspects 1 through 13, wherein identifying the hybrid scheduling configuration comprises: identifying two or more preconfigured occasion patterns for the plurality of preconfigured occasions, wherein a first dynamic scheduling indication is associated with a first preconfigured occasion pattern of the two or more preconfigured occasion patterns and a second dynamic scheduling indication is associated with a second preconfigured occasion pattern of the two or more preconfigured occasion patterns, and wherein monitoring for the dynamic scheduling indication comprises: monitoring for at least one of the first dynamic scheduling indication or the second dynamic scheduling indication.

Aspect 15: The method of aspect 14, further comprising: receiving an indication that the first dynamic scheduling indication is associated with the first preconfigured occasion pattern and that the second dynamic scheduling indication is associated with the second preconfigured occasion pattern.

Aspect 16: The method of aspect 15, wherein the indication is received via radio resource control signaling, via the dynamic scheduling indication, or a combination thereof.

Aspect 17: The method of any of aspects 1 through 16, wherein identifying the hybrid scheduling configuration comprises: identifying two or more preconfigured occasion patterns for the plurality of preconfigured occasions, wherein the dynamic scheduling indication is associated with each of the two or more preconfigured occasion patterns.

Aspect 18: The method of aspect 17, wherein the dynamic scheduling indication includes an indication of whether at least one of the two or more preconfigured occasion patterns comprises a data transmission during a corresponding preconfigured occasion.

Aspect 19: The method of any of aspects 17 through 18, wherein the dynamic scheduling indication includes a respective indication of whether each of the two or more preconfigured occasion patterns comprises a data transmission during a corresponding preconfigured occasion.

Aspect 20: The method of any of aspects 1 through 19, further comprising: identifying, via the dynamic scheduling indication, an indication that a data transmission scheduled during an interval comprises an original data transmission, or a retransmission of data associated with the plurality of preconfigured occasions, or a combination thereof.

Aspect 21: The method of aspect 20, wherein the original data transmission is scheduled in accordance with the plurality of preconfigured occasions.

Aspect 22: The method of any of aspects 20 through 21, further comprising: receiving a physical downlink control channel that indicates scheduling of the retransmission of the data associated with the plurality of preconfigured occasions; and receiving the retransmission of the data based at least in part on the received physical downlink control channel.

Aspect 23: The method of any of aspects 1 through 22, further comprising: identifying, via the dynamic scheduling indication, an indication that a data transmission scheduled during a first time interval comprises an original data transmission, or a retransmission of data, or a combination thereof; and receiving, during the first time interval, at least one of the original data transmission or the retransmission in accordance with the plurality of preconfigured occasions, wherein another retransmission of data is received during a second time interval different from the first time interval.

Aspect 24: The method of any of aspects 1 through 23, further comprising: identifying, via the dynamic scheduling indication, an indication that a data transmission scheduled during a first time interval comprises an original data transmission; receiving, during the first time interval, the original data transmission in accordance with the plurality of preconfigured occasions, wherein a retransmission of data is received during a second time interval different from the first time interval.

Aspect 25: The method of any of aspects 1 through 24, further comprising: identifying, via a first dynamic scheduling indication, an indication that a first data transmission comprises an original data transmission; identifying, via a second dynamic scheduling indication, an indication that a second data transmission comprises a retransmission of data; and receiving the original data transmission and the retransmission of data based at least in part on the plurality of preconfigured occasions.

Aspect 26: The method of any of aspects 1 through 25, further comprising: identifying, via a first dynamic scheduling indication, an indication that a first data transmission scheduled during a first time interval comprises an original data transmission; identifying, via a second dynamic scheduling indication, an indication that a second data transmission scheduled during a second time interval different from the first time interval comprises a retransmission of data; and receiving, during the first time interval, the original data transmission in accordance with the plurality of preconfigured occasions, wherein the second data transmission is received during the second time interval.

Aspect 27: The method of any of aspects 1 through 26, further comprising: monitoring for a physical downlink control channel that indicates a retransmission of data associated with the plurality of preconfigured occasions; and receiving the retransmission of data based at least in part on receiving the physical downlink control channel.

Aspect 28: The method of any of aspects 1 through 27, further comprising: receiving, via the dynamic scheduling indication, an indication that a physical downlink control channel that releases the plurality of preconfigured occasions is transmitted.

Aspect 29: The method of any of aspects 1 through 28, wherein the dynamic scheduling indication comprises a first physical downlink control channel having a cyclic redundancy check scrambled by a first radio network temporary identifier that is different from a second radio network temporary identifier used to scramble a cyclic redundancy check of a second physical downlink control channel for activating the plurality of preconfigured occasions.

Aspect 30: The method of aspect 29, wherein the first radio network temporary identifier comprises a power saving radio network temporary identifier.

Aspect 31: The method of any of aspects 1 through 30, wherein the dynamic scheduling indication is received in a first control resource set, or a first search space set, or both, that is different from a second control resource set, or a second search space set, or both, for a second physical downlink control channel for activating the plurality of preconfigured occasions.

Aspect 32: The method of any of aspects 1 through 31, wherein monitoring for the dynamic scheduling indication comprises: monitoring for the dynamic scheduling indication during a temporally first portion of each time interval corresponding to the plurality of preconfigured occasions.

Aspect 33: The method of any of aspects 1 through 32, further comprising: identifying a maximum number of physical control channel candidates for respective aggregation levels for the dynamic scheduling indication based at least in part on a search space set configuration, wherein monitoring for the dynamic scheduling indication is based at least in part on the maximum number of physical control channel candidates.

Aspect 34: The method of any of aspects 1 through 33, wherein the dynamic scheduling indication includes UE-specific downlink control information.

Aspect 35: The method of any of aspects 1 through 34, wherein the dynamic scheduling indication includes a group-common downlink control information, the method further comprising: identifying, via the group-common downlink control information, a mapping of a content field included in the group-common downlink control information.

Aspect 36: The method of any of aspects 1 through 35, further comprising: receiving, via the dynamic scheduling indication, one or more parameters that replace or modify the initial scheduling parameters.

Aspect 37: The method of aspect 36, wherein the one or more parameters comprise a time domain resource assignment, a frequency domain resource assignment shift; a physical uplink control channel resource, a modulation and coding scheme, an HARQ feedback timing, or a combination thereof.

Aspect 38: A method for wireless communication at a base station comprising: configuring a hybrid scheduling configuration that comprises a dynamic scheduling indication, a preconfiguration comprising initial scheduling parameters, and a plurality of preconfigured occasions for communicating data; transmitting, to one or more UEs, the dynamic scheduling indication based at least in part on the initial scheduling parameters and the plurality of preconfigured occasions; and communicating with the one or more UEs based at least in part on transmitting the dynamic scheduling indication.

Aspect 39: The method of aspect 38, wherein transmitting the dynamic scheduling indication comprises: transmitting a dynamic scheduling physical downlink control channel including downlink control information, the downlink control information having UE-specific information for each of the one or more UEs.

Aspect 40: The method of aspect 39, further comprising: configuring, via the downlink control information, one or more scheduling parameters for the one or more UEs, wherein the one or more scheduling parameters comprise a time-domain resource assignment, a modulation and coding scheme, an HARQ feedback timing, or a combination thereof.

Aspect 41: The method of any of aspects 38 through 40, further comprising: transmitting, to the one or more UEs, an indication of a periodicity and initial scheduling parameters for downlink transmissions, wherein the plurality of preconfigured occasions are based at least in part on the periodicity and the initial scheduling parameters for the downlink transmissions.

Aspect 42: The method of any of aspects 38 through 41, further comprising: transmitting, to the one or more UEs, an indication of a periodicity and initial scheduling parameters for uplink transmissions, wherein the plurality of preconfigured occasions are based at least in part on the periodicity and the initial scheduling parameters for the uplink transmissions.

Aspect 43: The method of any of aspects 38 through 42, further comprising: identifying a control resource set and a search space set that configure the dynamic scheduling indication; configuring a first set of parameters for monitoring for the dynamic scheduling indication based at least in part on the control resource set; and configuring a second set of parameters for monitoring for the dynamic scheduling indication based at least in part on the search space set, wherein the monitoring is based at least in part on the first set of parameters and the second set of parameters.

Aspect 44: The method of aspect 43, wherein the first set of parameters comprises frequency-domain resources for the dynamic scheduling indication and a duration of one or more symbols for monitoring for the dynamic scheduling indication; and the second set of parameters comprises a monitoring occasion periodicity, a monitoring occasion offset, a starting symbol for monitoring occasions, an aggregation level, a number of downlink control channel candidates for each aggregation level, or a combination thereof.

Aspect 45: The method of any of aspects 38 through 44, further comprising: configuring one or more monitoring occasions for the dynamic scheduling indication, the one or more monitoring occasions coinciding with the plurality of preconfigured occasions, wherein the dynamic scheduling indication is transmitted in accordance with the one or more monitoring occasions and the plurality of preconfigured occasions.

Aspect 46: The method of any of aspects 38 through 45, further comprising: configuring one or more monitoring occasions for the dynamic scheduling indication, wherein the dynamic scheduling indication is transmitted during each monitoring occasion of the one or more monitoring occasions that corresponds to a preconfigured scheduling occasion of the plurality of preconfigured occasions.

Aspect 47: The method of any of aspects 38 through 46, further comprising: configuring one or more monitoring occasions for the dynamic scheduling indication, wherein the dynamic scheduling indication is transmitted during each monitoring occasion of the one or more monitoring occasions that corresponds to a preconfigured scheduling occasion of the plurality of preconfigured occasions, and wherein the one or more monitoring occasions are based at least in part on a monitoring pattern indicated by a search space set configuration.

Aspect 48: The method of any of aspects 38 through 47, wherein transmitting the dynamic scheduling indication comprises: transmitting the dynamic scheduling indication during one or more monitoring occasions based at least in part on a monitoring pattern indicated by a search space set configuration.

Aspect 49: The method of any of aspects 38 through 48, wherein the plurality of preconfigured occasions comprise a subset of the one or more monitoring occasions.

Aspect 50: The method of any of aspects 38 through 49, wherein configuring the hybrid scheduling configuration comprises: configuring two or more preconfigured occasion patterns for the plurality of preconfigured occasions, wherein a first dynamic scheduling indication is associated with a first preconfigured occasion pattern of the two or more preconfigured occasion patterns and a second dynamic scheduling indication is associated with a second preconfigured occasion pattern of the two or more preconfigured occasion patterns, and wherein transmitting the dynamic scheduling indication comprises: transmitting at least one of the first dynamic scheduling indication or the second dynamic scheduling indication.

Aspect 51: The method of aspect 50, further comprising: transmitting an indication that the first dynamic scheduling indication is associated with the first preconfigured occasion pattern and that the second dynamic scheduling indication is associated with the second preconfigured occasion pattern.

Aspect 52: The method of aspect 51, wherein the indication is transmitted via radio resource control signaling, via the dynamic scheduling indication, or a combination thereof.

Aspect 53: The method of any of aspects 38 through 52, wherein configuring hybrid scheduling configuration comprises: configuring two or more preconfigured occasion patterns for the plurality of preconfigured occasions, wherein the dynamic scheduling indication is associated with each of the two or more preconfigured occasion patterns.

Aspect 54: The method of aspect 53, wherein the dynamic scheduling indication includes an indication of whether at least one of the two or more preconfigured occasion patterns comprises a data transmission during a corresponding preconfigured occasion.

Aspect 55: The method of any of aspects 53 through 54, wherein the dynamic scheduling indication includes a respective indication of whether each of the two or more preconfigured occasion patterns comprises a data transmission during a corresponding preconfigured occasion.

Aspect 56: The method of any of aspects 38 through 55, further comprising: transmitting, via the dynamic scheduling indication, an indication that a data transmission scheduled during a time interval comprises an original data transmission, or a retransmission of data associated with the plurality of preconfigured occasions, or a combination thereof.

Aspect 57: The method of aspect 56, wherein the original data transmission is scheduled in accordance with the plurality of preconfigured occasions.

Aspect 58: The method of any of aspects 56 through 57, further comprising: transmitting a physical downlink control channel that indicates scheduling of the retransmission of the data associated with the plurality of preconfigured occasions; and transmitting the retransmission of the data based at least in part on the transmitted physical downlink control channel.

Aspect 59: The method of any of aspects 38 through 58, further comprising: transmitting, via the dynamic scheduling indication, an indication that a data transmission scheduled during a first time interval comprises an original data transmission, or a retransmission of data, or a combination thereof; and transmitting, during the first time interval, at least one of the original data transmission or the retransmission in accordance with the plurality of preconfigured occasions, wherein another retransmission of data is transmitted during a second time interval different from the first time interval.

Aspect 60: The method of any of aspects 38 through 59, further comprising: transmitting, via the dynamic scheduling indication, an indication that a data transmission scheduled during a first time interval comprises an original data transmission; transmitting, during the first time interval, the original data transmission in accordance with the plurality of preconfigured occasions, wherein a retransmission of data is transmitted during a second time interval different from the first time interval.

Aspect 61: The method of any of aspects 38 through 60, further comprising: transmitting, via a first dynamic scheduling indication, an indication that a first data transmission comprises an original data transmission; transmitting, via a second dynamic scheduling indication, an indication that a second data transmission comprises a retransmission of data; and transmitting the original data transmission and the retransmission of data based at least in part on the plurality of preconfigured occasions.

Aspect 62: The method of any of aspects 38 through 61, further comprising: transmitting, via a first dynamic scheduling indication, an indication that a first data transmission scheduled during a first time interval comprises an original data transmission; transmitting, via a second dynamic scheduling indication, an indication that a second data transmission scheduled during a second time interval different from the first time interval comprises a retransmission of data; and transmitting, during the first time interval, the original data transmission in accordance with the plurality of preconfigured occasions.

Aspect 63: The method of any of aspects 38 through 62, further comprising: transmitting a physical downlink control channel that indicates a retransmission of data associated with the plurality of preconfigured occasions; and transmitting the retransmission of data based at least in part on receiving the physical downlink control channel, wherein the retransmission of data is transmitted during occasions that are different from the plurality of preconfigured occasions.

Aspect 64: The method of any of aspects 38 through 63, further comprising: transmitting, via the dynamic scheduling indication, an indication that a physical downlink control channel that releases the plurality of preconfigured occasions is transmitted.

Aspect 65: The method of any of aspects 38 through 64, wherein the dynamic scheduling indication comprises a first physical downlink control channel having a cyclic redundancy check scrambled by a first radio network temporary identifier that is different from a second radio network temporary identifier used to scramble a cyclic redundancy check of a second physical downlink control channel for activating the plurality of preconfigured occasions.

Aspect 66: The method of aspect 65, wherein the first radio network temporary identifier comprises a power saving radio network temporary identifier.

Aspect 67: The method of any of aspects 38 through 66, wherein the dynamic scheduling indication is transmitted in a first control resource set, or a first search space set, or both, that is different from a second control resource set, or a second search space set, or both, for a second physical downlink control channel for activating the plurality of preconfigured occasions.

Aspect 68: The method of any of aspects 38 through 67, wherein transmitting the dynamic scheduling indication comprises: transmitting the dynamic scheduling indication during a temporally first portion of each time interval corresponding to the plurality of preconfigured occasions.

Aspect 69: The method of any of aspects 38 through 68, further comprising: configuring a maximum number of physical control channel candidates for respective aggregation levels for the dynamic scheduling indication based at least in part on a search space set configuration; and transmitting an indication of the maximum number of physical control channel candidates to the one or more UEs.

Aspect 70: The method of any of aspects 38 through 69, wherein the dynamic scheduling indication includes UE-specific downlink control information.

Aspect 71: The method of any of aspects 38 through 70, wherein the dynamic scheduling indication includes a group-common downlink control information, the method further comprising: transmitting, via the group-common downlink control information, a mapping of a content field included in the group-common downlink control information.

Aspect 72: The method of any of aspects 38 through 71, further comprising: transmitting, via the dynamic scheduling indication, one or more parameters that replace or modify the initial scheduling parameters.

Aspect 73: The method of aspect 72, wherein the one or more parameters comprise a time domain resource assignment, a frequency domain resource assignment shift; a physical uplink control channel resource, a modulation and coding scheme, an HARQ feedback timing, or a combination thereof.

Aspect 74: An apparatus for wireless communication at a UE, comprising a processor; memory coupled with the processor; and instructions stored in the memory and executable by the processor to cause the apparatus to perform a method of any of aspects 1 through 37.

Aspect 75: An apparatus for wireless communication at a UE, comprising at least one means for performing a method of any of aspects 1 through 37.

Aspect 76: A non-transitory computer-readable medium storing code for wireless communication at a UE, the code comprising instructions executable by a processor to perform a method of any of aspects 1 through 37.

Aspect 77: An apparatus comprising a processor; memory coupled with the processor; and instructions stored in the memory and executable by the processor to cause the apparatus to perform a method of any of aspects 38 through 73.

Aspect 78: An apparatus comprising at least one means for performing a method of any of aspects 38 through 73.

Aspect 79: A non-transitory computer-readable medium storing code the code comprising instructions executable by a processor to perform a method of any of aspects 38 through 73.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a hybrid scheduling configuration that comprises a preconfiguration comprising initial scheduling parameters and a plurality of preconfigured occasions for communicating data, wherein the initial scheduling parameters and the plurality of preconfigured occasions are based at least in part on semi-persistent scheduling information, and wherein preconfigured occasions of the plurality of preconfigured occasions are associated with a periodicity;
    monitoring the plurality of preconfigured occasions for a dynamic scheduling indication in accordance with the periodicity based at least in part on the initial scheduling parameters and dynamic scheduling information included in the hybrid scheduling configuration; and
    communicating with a network node based at least in part on receiving the dynamic scheduling indication during a first preconfigured occasion of the plurality of preconfigured occasions.

2. The method of claim 1, wherein monitoring the plurality of preconfigured occasions for the dynamic scheduling indication comprises:
    monitoring for a dynamic scheduling physical downlink control channel including downlink control information, the downlink control information having UE-specific information for one or more UEs.

3. The method of claim 2, further comprising:
    receiving the dynamic scheduling physical downlink control channel; and
    decoding the dynamic scheduling physical downlink control channel to obtain scheduling information for one or more of the plurality of preconfigured occasions, wherein communicating with the network node is based at least in part on the scheduling information.

4. The method of claim 2, further comprising:
    identifying, via the downlink control information, one or more scheduling parameters, wherein the one or more scheduling parameters comprise a time-domain resource assignment, a modulation and coding scheme, a hybrid automatic repeat request (HARQ) feedback timing, or a combination thereof.

5. The method of claim 1, further comprising:
    receiving, from the network node, an indication of the periodicity and initial scheduling parameters for downlink transmissions, wherein the plurality of preconfigured occasions are based at least in part on the periodicity and the initial scheduling parameters for the downlink transmissions.

6. The method of claim 1, further comprising:
    receiving, from the network node, an indication of the periodicity and initial scheduling parameters for uplink transmissions, wherein the plurality of preconfigured occasions are based at least in part on the periodicity and the initial scheduling parameters for the uplink transmissions.

7. The method of claim 1, further comprising:
    identifying a control resource set and a search space set that configure the dynamic scheduling indication;
    identifying a first set of parameters for monitoring the plurality of preconfigured occasions for the dynamic scheduling indication based at least in part on the control resource set; and
    identifying a second set of parameters for monitoring the plurality of preconfigured occasions for the dynamic scheduling indication based at least in part on the search space set, wherein monitoring the plurality of preconfigured occasions is based at least in part on the first set of parameters and the second set of parameters.

8. The method of claim 7, wherein:
    the first set of parameters comprises frequency-domain resources for the dynamic scheduling indication and a duration of one or more symbols for monitoring for the dynamic scheduling indication; and
    the second set of parameters comprises a monitoring occasion periodicity, a monitoring occasion offset, a starting symbol for monitoring occasions, an aggregation level, a number of downlink control channel candidates for each aggregation level, or a combination thereof.

9. The method of claim 1, wherein:
    the dynamic scheduling indication includes UE-specific downlink control information; or
    the dynamic scheduling indication includes a group-common downlink control information, the method further comprising:
    identifying, via the group-common downlink control information, a mapping of a content field included in the group-common downlink control information.

10. The method of claim 1, further comprising:
    receiving, via the dynamic scheduling indication, one or more parameters that replace or modify the initial scheduling parameters.

11. The method of claim 10, wherein the one or more parameters comprise a time domain resource assignment, a frequency domain resource assignment shift; a physical uplink control channel resource, a modulation and coding scheme, a hybrid automatic repeat request (HARQ) feedback timing, or a combination thereof.

12. The method of claim 1, wherein the dynamic scheduling indication comprises a first physical downlink control channel having a cyclic redundancy check scrambled by a first radio network temporary identifier that is different from a second radio network temporary identifier used to scramble a cyclic redundancy check of a second physical downlink control channel for activating the plurality of preconfigured occasions.

13. The method of claim 12, wherein the first radio network temporary identifier comprises a power saving radio network temporary identifier.

14. The method of claim 1, wherein the dynamic scheduling indication is received in a first control resource set, or a first search space set, or both, that is different from a second control resource set, or a second search space set, or both, for a second physical downlink control channel for activating the plurality of preconfigured occasions.

15. The method of claim 1, wherein monitoring the plurality of preconfigured occasions for the dynamic scheduling indication comprises:
monitoring the plurality of preconfigured occasions for the dynamic scheduling indication during a temporally first portion of each time interval corresponding to the plurality of preconfigured occasions.

16. The method of claim 1, further comprising:
identifying a maximum number of physical control channel candidates for respective aggregation levels for the dynamic scheduling indication based at least in part on a search space set configuration, wherein monitoring for the dynamic scheduling indication is based at least in part on the maximum number of physical control channel candidates.

17. The method of claim 1, further comprising:
identifying one or more monitoring occasions for the dynamic scheduling indication, the one or more monitoring occasions coinciding with the plurality of preconfigured occasions, wherein monitoring the plurality of preconfigured occasions for the dynamic scheduling indication is in accordance with the one or more monitoring occasions and the plurality of preconfigured occasions.

18. The method of claim 1, further comprising:
identifying one or more monitoring occasions for the dynamic scheduling indication, wherein monitoring the plurality of preconfigured occasions for the dynamic scheduling indication is performed during each monitoring occasion of the one or more monitoring occasions that corresponds to a preconfigured scheduling occasion of the plurality of preconfigured occasions.

19. The method of claim 1, further comprising:
identifying one or more monitoring occasions for the dynamic scheduling indication, wherein monitoring the plurality of preconfigured occasions for the dynamic scheduling indication is performed during each monitoring occasion of the one or more monitoring occasions that corresponds to a preconfigured scheduling occasion of the plurality of preconfigured occasions, and wherein the one or more monitoring occasions are based at least in part on a monitoring pattern indicated by a search space set configuration.

20. The method of claim 1, wherein monitoring the plurality of preconfigured occasions for the dynamic scheduling indication comprises:
monitoring the plurality of preconfigured occasions for the dynamic scheduling indication during one or more monitoring occasions based at least in part on a monitoring pattern indicated by a search space set configuration, wherein the plurality of preconfigured occasions comprise a subset of the one or more monitoring occasions.

21. The method of claim 1, wherein identifying the hybrid scheduling configuration comprises:
identifying two or more preconfigured occasion patterns for the plurality of preconfigured occasions, wherein a first dynamic scheduling indication is associated with a first preconfigured occasion pattern of the two or more preconfigured occasion patterns and a second dynamic scheduling indication is associated with a second preconfigured occasion pattern of the two or more preconfigured occasion patterns, and wherein monitoring the plurality of preconfigured occasions for the dynamic scheduling indication comprises; and
monitoring for at least one of the first dynamic scheduling indication or the second dynamic scheduling indication.

22. The method of claim 21, further comprising:
receiving an indication that the first dynamic scheduling indication is associated with the first preconfigured occasion pattern and that the second dynamic scheduling indication is associated with the second preconfigured occasion pattern, wherein the indication is received via radio resource control signaling, via the dynamic scheduling indication, or a combination thereof.

23. The method of claim 1, wherein identifying the hybrid scheduling configuration comprises:
identifying two or more preconfigured occasion patterns for the plurality of preconfigured occasions, wherein the dynamic scheduling indication is associated with each of the two or more preconfigured occasion patterns, wherein the dynamic scheduling indication includes an indication of whether at least one of the two or more preconfigured occasion patterns comprises a data transmission during a corresponding preconfigured occasion, or wherein the dynamic scheduling indication includes a respective indication of whether each of the two or more preconfigured occasion patterns comprises a respective data transmission during the corresponding preconfigured occasion.

24. The method of claim 1, further comprising:
identifying, via the dynamic scheduling indication, an indication that a data transmission scheduled during an interval comprises an original data transmission, or a retransmission of data associated with the plurality of preconfigured occasions, or a combination thereof;
receiving a physical downlink control channel that indicates scheduling of the retransmission of the data associated with the plurality of preconfigured occasions; and
receiving the retransmission of the data based at least in part on the received physical downlink control channel.

25. The method of claim 1, further comprising:
identifying, via the dynamic scheduling indication, an indication that a data transmission scheduled during a first time interval comprises an original data transmission scheduled in accordance with the plurality of preconfigured occasions, or a retransmission of data, or a combination thereof; and
receiving, during the first time interval, at least one of the original data transmission or the retransmission of the data in accordance with the plurality of preconfigured occasions, wherein another retransmission of data is received during a second time interval different from the first time interval, or wherein the retransmission of the data is received during a third time interval different from the first time interval.

26. The method of claim 1, further comprising:
identifying, via a first dynamic scheduling indication, an indication that a first data transmission comprises an original data transmission;
identifying, via a second dynamic scheduling indication, an indication that a second data transmission comprises a retransmission of data; and
receiving the original data transmission and the retransmission of data based at least in part on the plurality of preconfigured occasions.

27. The method of claim 1, further comprising:
identifying, via a first dynamic scheduling indication, an indication that a first data transmission scheduled during a first time interval comprises an original data transmission;
identifying, via a second dynamic scheduling indication, an indication that a second data transmission scheduled during a second time interval different from the first time interval comprises a retransmission of data; and
receiving, during the first time interval, the original data transmission in accordance with the plurality of preconfigured occasions, wherein the second data transmission is received during the second time interval.

28. An apparatus for wireless communication at a user equipment (UE), comprising:
a processor,
memory coupled with the processor; and
instructions stored in the memory and executable by the processor to cause the apparatus to:
identify a hybrid scheduling configuration that comprises a preconfiguration comprising initial scheduling parameters and a plurality of preconfigured occasions for communicating data, wherein the initial scheduling parameters and the plurality of preconfigured occasions are based at least in part on semi-persistent scheduling information, and wherein the plurality of preconfigured occasions is associated with a periodicity;
monitor the plurality of preconfigured occasions for a dynamic scheduling indication in accordance with the periodicity based at least in part on the initial scheduling parameters and dynamic scheduling information included in the hybrid scheduling configuration; and
communicate with a network node based at least in part on receiving the dynamic scheduling indication during a first preconfigured occasion of the plurality of preconfigured occasions.

29. An apparatus for wireless communication at a user equipment (UE), comprising:
means for identifying a hybrid scheduling configuration that comprises a preconfiguration comprising initial scheduling parameters and a plurality of preconfigured occasions for communicating data, wherein the initial scheduling parameters and the plurality of preconfigured occasions are based at least in part on semi-persistent scheduling information, and wherein the plurality of preconfigured occasions is associated with a periodicity;
means for monitoring the plurality of preconfigured occasions for a dynamic scheduling indication in accordance with the periodicity based at least in part on the initial scheduling parameters and dynamic scheduling information included in the hybrid scheduling configuration; and
means for communicating with a network node based at least in part on receiving the dynamic scheduling indication during a first preconfigured occasion of the plurality of preconfigured occasions.

30. A non-transitory computer-readable medium storing code for wireless communication at a user equipment (UE), the code comprising instructions executable by a processor to:
identify a hybrid scheduling configuration that comprises a preconfiguration comprising initial scheduling parameters and a plurality of preconfigured occasions for communicating data, wherein the initial scheduling parameters and the plurality of preconfigured occasions are based at least in part on semi-persistent scheduling information, and wherein the plurality of preconfigured occasions is associated with a periodicity;
monitor the plurality of preconfigured occasions for a dynamic scheduling indication in accordance with the periodicity based at least in part on the initial scheduling parameters and dynamic scheduling information included in the hybrid scheduling configuration; and
communicate with a network node based at least in part on receiving the dynamic scheduling indication during a first preconfigured occasion of the plurality of preconfigured occasions.

\* \* \* \* \*